(12) United States Patent
Katsuno et al.

(10) Patent No.: US 7,859,587 B2
(45) Date of Patent: Dec. 28, 2010

(54) SOLID-STATE IMAGE PICKUP DEVICE

(75) Inventors: Motonari Katsuno, Kyoto (JP); Ryohei Miyagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 780 days.

(21) Appl. No.: 11/723,459

(22) Filed: Mar. 20, 2007

(65) Prior Publication Data
US 2007/0222885 A1 Sep. 27, 2007

(30) Foreign Application Priority Data
Mar. 24, 2006 (JP) ............................. 2006-083658

(51) Int. Cl.
*H04N 5/225* (2006.01)
(52) U.S. Cl. .................. 348/340; 348/251; 348/241; 348/243; 348/246; 348/247; 348/272; 348/350; 257/231; 359/600; 359/619; 359/620
(58) Field of Classification Search ................. 348/241, 348/243, 246, 247, 272, 340, 350, 251; 257/231
See application file for complete search history.

(56) References Cited

U.S. PATENT DOCUMENTS 5,682,203 A * 10/1997 Kato .................... 348/340
6,455,831 B1 * 9/2002 Bandera et al. ............ 250/208.1
2005/0035377 A1 * 2/2005 Kamimura et al. .......... 257/231
2006/0187553 A1 * 8/2006 Tanaka et al. ............. 359/619

FOREIGN PATENT DOCUMENTS

JP 2001-237404 8/2001

* cited by examiner

*Primary Examiner*—Jason Chan
*Assistant Examiner*—Yih-Sien Kao
(74) *Attorney, Agent, or Firm*—McDermott Will & Emery LLP

(57) ABSTRACT

In a solid-state image pickup device, it is difficult to match an optimum incidence angle corresponding to an image height of a pixel array region with light incidence characteristics of a camera lens, thereby causing image quality deterioration due to sensitivity shading. Respective microlenses are disposed in a two-dimensional manner, i.e., in a row and a column directions. In particular, the microlenses are disposed such that each side of a disposition region where the microlenses are disposed has a concave curve with respect to a line connecting adjacent vertexes of the disposition region. In other words, a distance $A_H$ ($A_V$) between center points of a pair of facing sides of the disposition region is set to be smaller than a distance $B_H$ ($B_V$) between neighboring vertexes of the disposition region.

4 Claims, 30 Drawing Sheets

SOLID LINE: A RELATIONSHIP BETWEEN AN IMAGE HEIGHT AND AN OPTIMUM INCIDENCE ANGLE IN A SHRINK METHOD OF THE PRESENT INVENTION
BROKEN LINE: A RELATIONSHIP BETWEEN AN IMAGE HEIGHT AND AN OPTIMUM INCIDENCE ANGLE IN A CONVENTIONAL SHRINK METHOD

SOLID LINE: A RELATIONSHIP BETWEEN AN IMAGE HEIGHT AND AN OPTIMUM INCIDENCE ANGLE
IN A SHRINK METHOD OF THE PRESENT INVENTION
BROKEN LINE: A RELATIONSHIP BETWEEN AN IMAGE HEIGHT AND AN OPTIMUM INCIDENCE ANGLE
IN A CONVENTIONAL SHRINK METHOD

DISPOSITION OF MICROLENSES

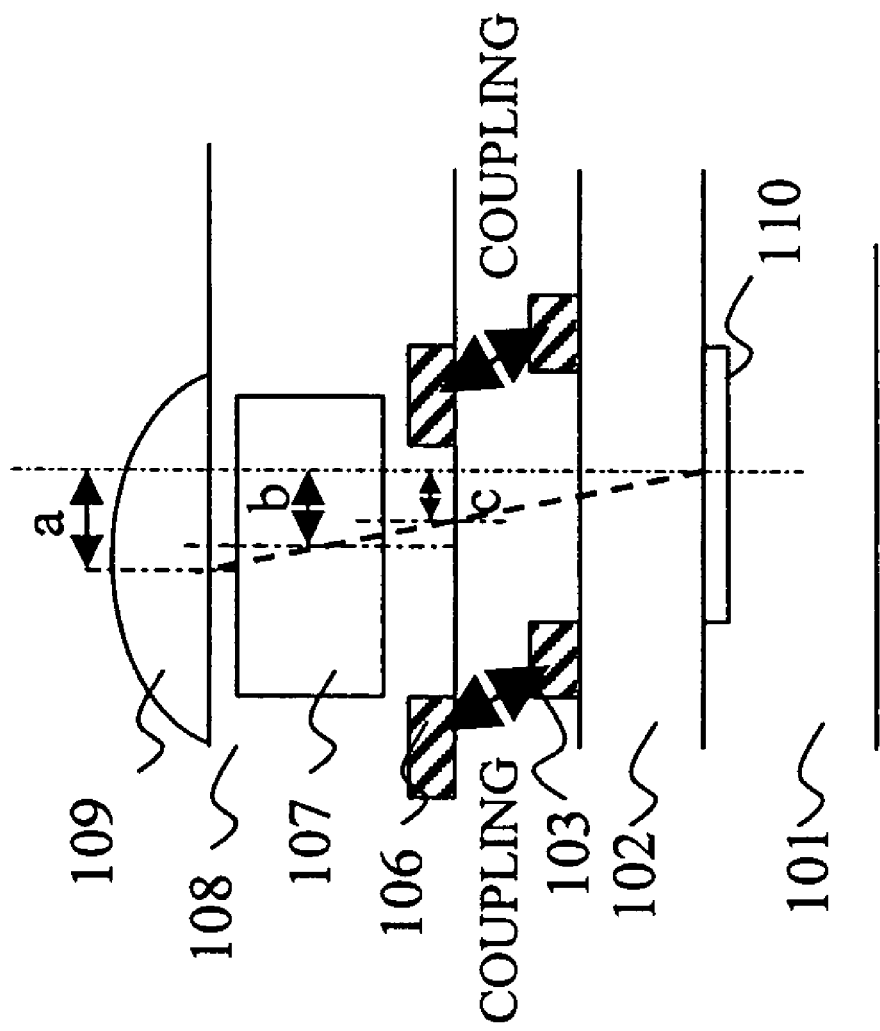

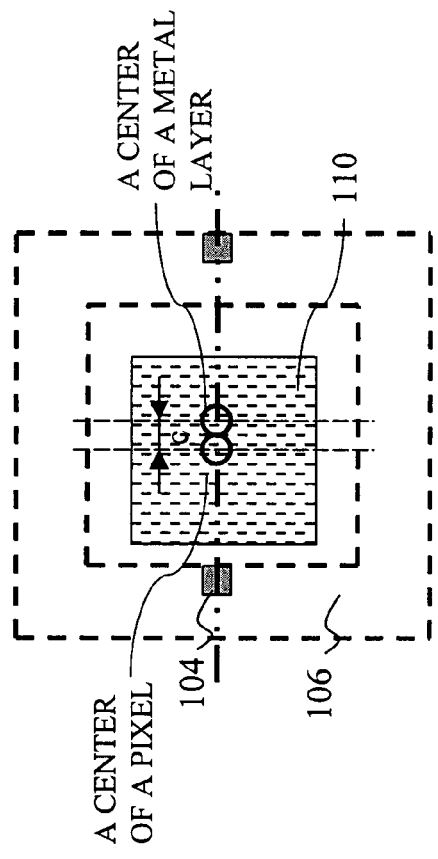
FIG. 15A PRIOR ART
FIG. 15B PRIOR ART
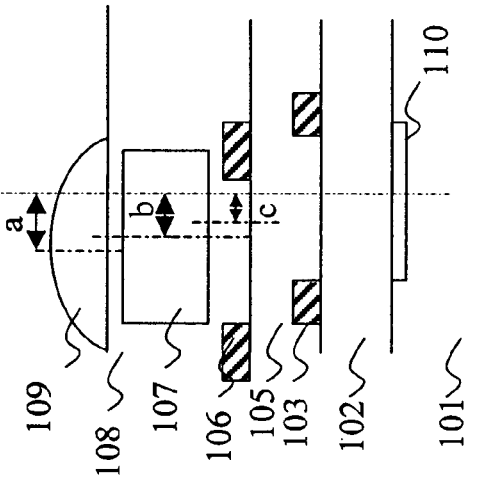
FIG. 15C PRIOR ART
FIG. 15D PRIOR ART

SOLID-STATE IMAGE PICKUP DEVICE

BACKGROUND OF THE INVENTION

1. Field of the Invention

The present invention relates to a solid-state image pickup device and more particularly, to a solid-state image pickup device in which shading is suppressed.

2. Description of the Background Art

Conventionally, as a solid-state image pickup device, an amplifying solid-state image pickup device and a CCD solid-state image pickup device have been well-known. In general, it is difficult for the amplifying solid-state image pickup device to obtain more excellent sensitivity characteristics than those obtained by the CCD solid-state image pickup device. The reason is as follows. To supply voltages to MOS-FETs in charge detection regions, the amplifying solid-state image pickup device requires a plurality of layers (two or more layers) of metal wires above a photoelectric conversion region. However, the metal wires block light and make it hard for incident light to reach the photoelectric conversion region.

FIG. 14 is a schematic diagram illustrating a configuration of a general amplifying solid-state image pickup device.

The solid-state image pickup device shown in FIG. 14 includes a pixel array region 10 in which a plurality of pixels including photodiodes are disposed in a two-dimensional matrix manner. In FIG. 14, only a part of the plurality of pixels included in the pixel array region 10 is shown.

Hereinafter, with reference to FIGS. 15A, 15B, 15C, and 15D, a conventional amplifying solid-state image pickup device disclosed in Japanese Laid-Open Patent Publication No. 2001-237404 will be described.

FIG. 15A is a schematic diagram illustrating a plane view of a pixel disposed in a central portion of a pixel array region and FIG. 15C is a schematic diagram illustrating a cross-sectional view of the pixel shown in FIG. 15A. FIG. 15B is a schematic diagram illustrating a plane view of a pixel disposed in a peripheral portion in the pixel array region and FIG. 15D is a schematic diagram illustrating a cross-sectional view of the pixel shown in FIG. 15B.

The pixels are formed on a surface of a semiconductor substrate 101, each of which includes a photodiode 110 serving as a photoelectric conversion region, an insulating film 102 covering the photodiode 110, a first metal film 103 covering the insulating film 102, a metal-embedded region 104 (not shown in FIGS. 15B and 15D), an insulating film 105, a second metal film 106 having an opening formed above the photoelectric conversion region, a color filter 107, an insulating film 108, and a microlens 109.

As shown in FIGS. 15A-15D, the pixel disposed in the central portion of the pixel array and the pixel disposed in the peripheral portion of the pixel array have a common layer structure. The pixel disposed in the peripheral portion of the pixel array is different from the pixel disposed in the central portion of the pixel array in that the microlens 109, the second metal film 106, and the metal-embedded region 104 are displaced from a center of the photodiode 110 toward a center of the pixel array by distances a, b, and c.

FIG. 16 is a schematic diagram explaining incidence of light into the pixel disposed in the central portion of the pixel array and the pixel disposed in the peripheral portion of the pixel array.

As shown in FIG. 16, a camera lens 111 is attached to the solid-state image pickup device via a frame or the like. When a center of the camera lens 111 is positioned immediately above the pixel in the central portion of the pixel array, light converged by the camera lens 111 enters the pixel in the central portion of the pixel array substantially in a vertical direction and enters in the pixel in the peripheral portion of the pixel array in an oblique direction.

Therefore, in order for more light to enter the photodiode 110 in the pixel in the peripheral portion of the pixel array, it is effective to displace the microlens 109, the second metal film 106, and the metal-embedded region 104 toward a light source side by the distances a, b, and c (hereinafter, this method is referred to as a "shrink method").

FIG. 17 is a schematic diagram showing a conventional shrink method. Specifically, in FIG. 17, a layout 1201 (solid line) shows disposition of the photodiodes 110; a layout 1202 (thin dotted line) shows disposition of the metal-embedded regions 104; a layout 1203 (broken line) shows disposition of the second metal films 106; and a layout 1204 (alternate long and two short dashes line) shows disposition of the microlenses 109. In order to enhance an efficiency of gathering light into the photodiode 110, a displacement amount a of the microlens 109, a displacement amount b of the second metal film 106, a displacement amount c of the metal-embedded region 104 are set so as to satisfy a relationship a>b>c.

In general, since two or more wiring layers are formed in the amplifying solid-state image pickup device, a distance between the photoelectric conversion region and the metal film is large. Accordingly, due to causes such as light blocking by the metal film, it is made hard for light to reach the photoelectric conversion region in the pixel in the peripheral portion of the pixel array, thereby causing a problem of deteriorating image quality. Therefore, the above-mentioned shrink method has been adopted.

However, the conventional shrink method may have difficulties in optimizing positions (i.e., displacement amounts) of the microlenses for all pixels in accordance with light incidence characteristics of the camera lens. This is because whereas the displacement amount of the microlens and an incidence angle are substantially in proportion to each other, an incidence angle of light entering the photodiode from the camera lens and an image height are not in proportion to each other.

Therefore, in the solid-state image pickup device of the conventional art, the greater a distance between a pixel and the center of the pixel array is, the less sufficient an amount of the incident light entering into the pixel becomes, thereby causing deterioration in image quality (sensitivity shading) due to a difference between the amount of the incident light entering into the pixel in the central portion of the pixel array and the amount of the incident light entering into the pixel in the peripheral portion of the pixel array.

SUMMARY OF THE INVENTION

Therefore, an object of the present invention is to provide a solid-state image pickup device in which sensitivity shading is suppressed.

One aspect of the present invention is directed to a solid-state image pickup device comprising a pixel array region, on a semiconductor substrate, where a plurality of pixels are two-dimensionally disposed in a row direction and a column direction. Each of the pixels includes a photoelectric conversion region and a microlens for converging light into the photoelectric conversion region. Disposition of the microlens is determined for each of the pixels, and the microlenses are two-dimensionally disposed with different pitches.

In each of the pixels, a displacement amount between a center of the pixel and a center of the microlens may be set to be a value obtained by multiplying a distance between the center of the pixel and a center of the pixel array region by a first coefficient. In this case, it is preferable that the value of the first coefficient varies depending on respective positions of at least two pixels.

The microlenses may be disposed in a disposition region such that an outer shape of the disposition region has at least one curve which connects two adjacent vertexes of the disposition region and is concave with respect to a line passing through the two adjacent vertexes.

A distance between a center of the microlens and a center of said each of the pixels may be set so as to increase in accordance with an increase in an image height until the image height reaches a predetermined value and to be substantially constant after the image height exceeds the predetermined value.

The pixel array region may include a plurality of partial regions, each of which includes a plurality of the pixels disposed in a rectangular array, and the microlenses may be disposed so as to have pitches which are different from each other between two neighboring partial regions.

The partial regions may be disposed so as to be point-symmetrical with respect to a center of the pixel array region.

The pixel array region has a rectangular shape, and vertexes of one of the partial regions may be positioned on diagonal lines of the pixel array region.

The pixel array region may include nine partial regions.

The pixel array region may have a rectangular shape, and vertexes of the partial regions may be positioned on an outer edge of the pixel array region.

The pixel array region may include three partial regions.

The pixels may be disposed such that a pitch between the pixels in a peripheral portion of the pixel array region is greater than a pitch between the pixels in a central portion of the pixel array region.

Another aspect of the present invention is directed to a solid-state image pickup device comprising a pixel array region, on a semiconductor substrate, where a plurality of pixels are two-dimensionally disposed in a row direction and a column direction. Each of the pixels includes: a photoelectric conversion region; a microlens for converging light into the photoelectric conversion region; and a metal film which has an opening formed between the microlens and the photoelectric conversion region. Disposition of the opening and the microlens is determined for each of the pixels. The microlenses are two-dimensionally disposed with different pitches, and the openings are two-dimensionally disposed with constant pitches.

In said each of the pixels, a displacement amount between a center of said each of the pixels and a center of the microlens may be set to be a value obtained by multiplying a distance between the center of said each of the pixels and a center of the pixel array region by a second coefficient, and in said each of the pixels, a displacement amount between a center of the opening and a center of said each of the pixels may be set to be a value obtained by multiplying a distance between the center of said each of the pixels and the center of the pixel array region by a third coefficient. In this case, it is preferable that the value of the second coefficient varies depending on respective positions of at least two pixels, and the value of the third coefficient is constant irrespective of respective positions of all the pixels.

The metal film may be formed in an uppermost layer of a multi-layer metal film.

The solid-state image pickup device may further comprise color filters. In this case, it is preferable that the color filters are two-dimensionally disposed with different pitches or with constant pitches for each pixel.

The microlenses may be disposed in a disposition region such that an outer shape of the disposition region has at least one curve which connects two adjacent vertexes of the disposition region and is concave with respect to a line passing through the two adjacent vertexes.

The pixel array region may include a plurality of partial regions, each of which includes a plurality of the pixels disposed in a rectangular array, and the microlenses may be disposed so as to have pitches which are different from each other between two neighboring partial regions.

The pixel array region may have a rectangular shape, and vertexes of the partial regions may be positioned on an outer edge of the pixel array region.

The pixels may be disposed such that a pitch between the pixels in a peripheral portion of the pixel array region is greater than a pitch between the pixels in a central portion of the pixel array region.

The solid-state image pickup device according to each of the above-mentioned aspects may be an amplifying solid-state image pickup device.

The solid-state image pickup device according to the present invention can suppress sensitivity shading caused by a reduction in an amount of incident light to the peripheral portion of the pixel array region. In addition, the solid-state image pickup device according to the present invention can be manufactured by using a fabrication process similar to that of the conventional solid-state image pickup device, thereby making it unnecessary to add a new fabrication process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13D is a schematic diagram illustrating a cross-sectional view of a pixel disposed in a peripheral portion of a pixel array region;

FIG. 15A is a schematic diagram illustrating a plane view of a pixel disposed in a central portion of a pixel array region;

FIG. 15B is a schematic diagram illustrating a plane view of a pixel disposed in a peripheral portion in the pixel array region;

FIG. 15C is a schematic diagram illustrating a cross-sectional view of the pixel shown in FIG. 15A;

FIG. 15D is a schematic diagram illustrating a cross-sectional view of the pixel shown in FIG. 15B;

DESCRIPTION OF THE PREFERRED EMBODIMENTS

Hereinafter, respective embodiments of the present invention will be described. In the specification, the term "pitch" means a distance between reference points of two elements in one direction (for example, in a row direction) and/or a distance between the reference points in a direction perpendicular to the one direction.

First Embodiment

Figure 1A:
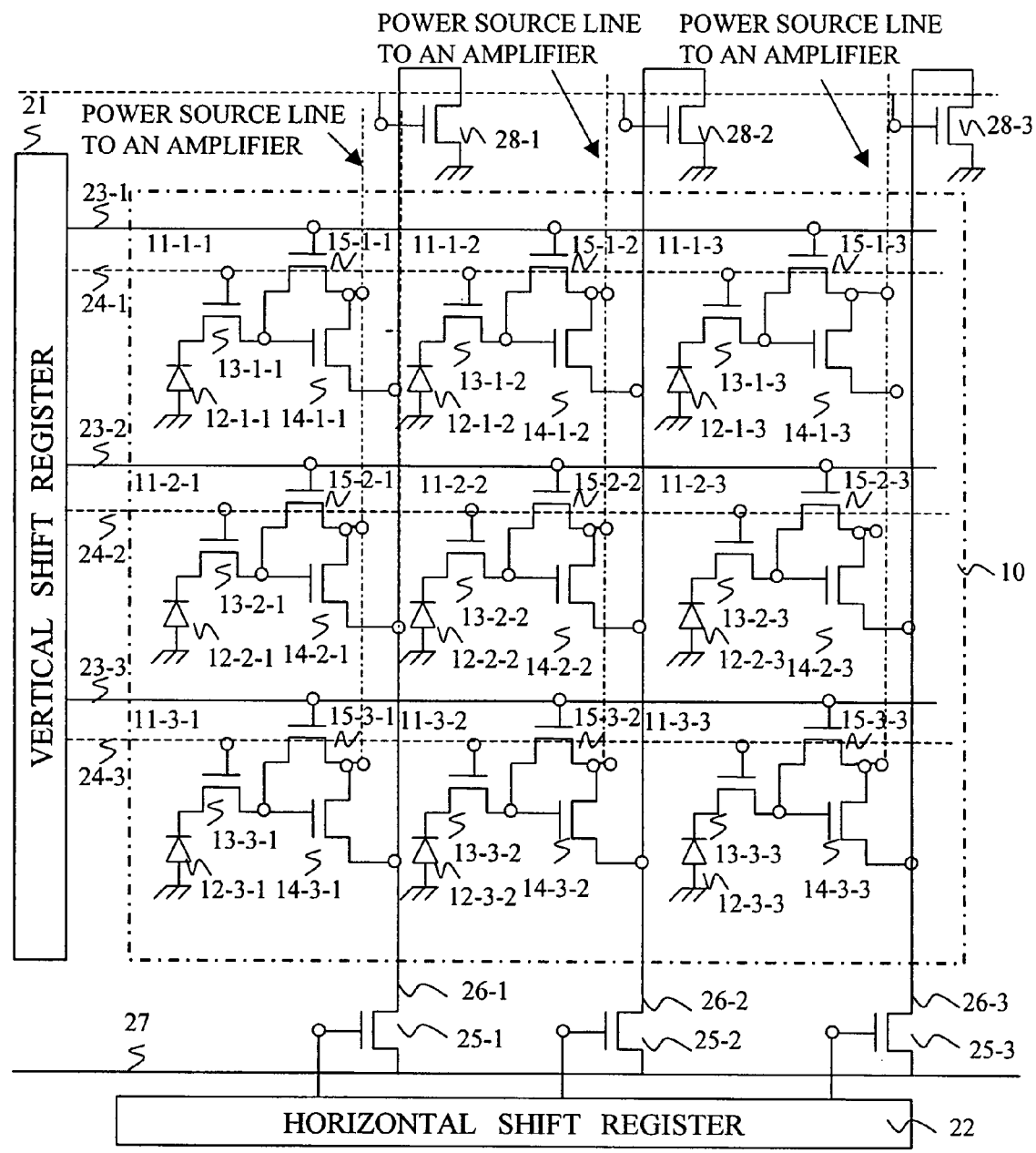
FIG. 1A is a diagram illustrating one example of a circuit configuration of a solid-state image pickup device according to a first embodiment of the present invention.
Figure 1B:
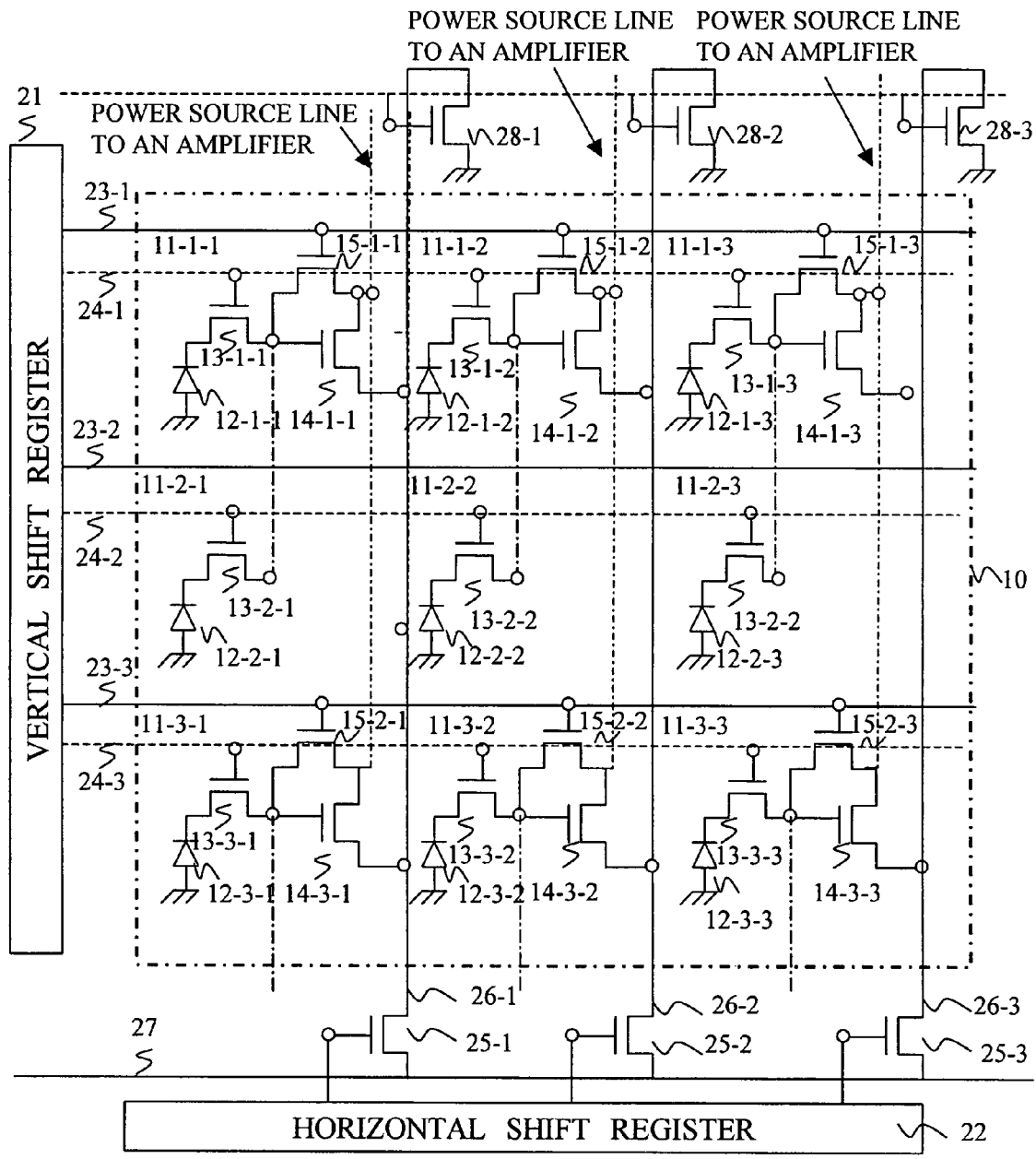
FIG. 1B is a diagram illustrating another example of a circuit configuration of a solid-state image pickup device according to the first embodiment.

FIG. 1A is a diagram illustrating one example of a circuit configuration of a solid-state image pickup device according to a first embodiment of the present invention, and FIG. 1B is a diagram illustrating another example of a circuit configuration of a solid-state image pickup device according to the first embodiment of the present invention.

The solid-state image pickup device according to the first embodiment includes a pixel array region 10 in which a plurality of pixels including photodiodes (12-1-1 to 12-3-1) are disposed in a two-dimensional matrix manner. In FIGS. 1A and 1B, only a part of the plurality of pixels included in the pixel array region 10 is shown.

FIG. 1A is a diagram illustrating a solid-state image pickup device having a "one pixel to one cell" configuration in which one pixel is included in one cell. In the solid-state image pickup device shown in FIG. 1A, one pixel includes, for example, a photodiode 12-1-1, a transfer transistor 13-1-1, a reset transistor 15-1-1, and an amplifier transistor 14-1-1.

FIG. 1B is a diagram illustrating the solid-state image pickup device having a "two pixels to one cell" configuration in which two pixels are included in one cell. In the solid-state image pickup device shown in FIG. 1B, one pixel includes, for example, two photodiodes 12-1-1 and 12-2-1, two transfer transistors 13-1-1 and 13-2-1, a reset transistor 15-1-1, and an amplifier transistor 14-1-1. The photodiodes 12-1-1 and 12-2-1 are connected to the transfer transistors 13-1-1 and 13-2-1, respectively. Output signals of the two photodiodes 12-1-1 and 12-2-1 are read out in response to ON/OFF switching of the transfer gates.

Figure 1C:
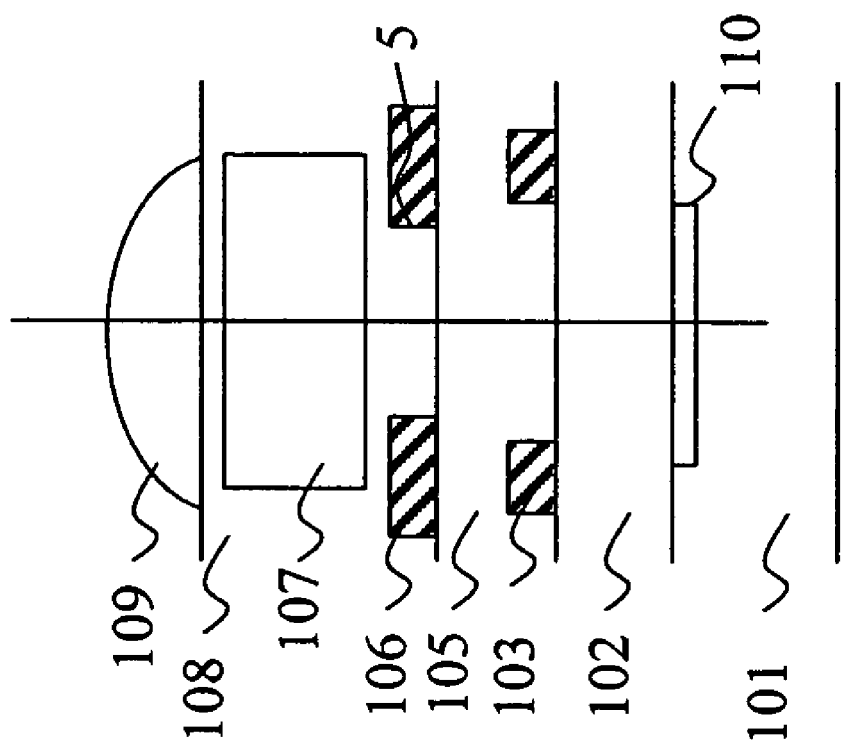
FIG. 1C is a diagram illustrating a cross-sectional view of a pixel disposed in a central portion of a pixel array region.

FIG. 1C is a diagram illustrating a cross-sectional view of a pixel disposed in a central portion of the pixel array region.

As shown in FIG. 1C, the pixels are formed on a surface of a semiconductor substrate 101, each of which includes a photodiode 110 serving as a photoelectric conversion region, an insulating film 102 formed so as to cover a surface of the photodiode 110, a first metal film 103 formed so as to cover a surface of the insulating film 102, an insulating film 105 formed so as to cover a surface of the first metal film 103, a second metal film 106 formed so as to cover a surface of the insulating film 105 and having an opening 5 formed above the photoelectric conversion region, a color filter 107 formed so as to cover the opening 5 of the second metal film 106, an insulating film 108, and a microlens (top lens) 109 for gathering light into the photoelectric conversion region. In a predetermined position of the pixel, a metal-embedded region (not shown) is formed. And a readout circuit (not shown) for reading out a signal from the photoelectric conversion region is provided in each of the pixels.

When a plurality of metal films are formed on a surface of the semiconductor substrate 101, the second metal film 106 is formed in an uppermost layer. There are cases where the second metal film 106 formed in the uppermost layer has a function of a wire and where the second metal film 106 formed in the uppermost layer has only a function of a light shielding film with no function of a wire. In the present embodiment, the second metal film 106 may be in either of the cases.

Figure 1D:
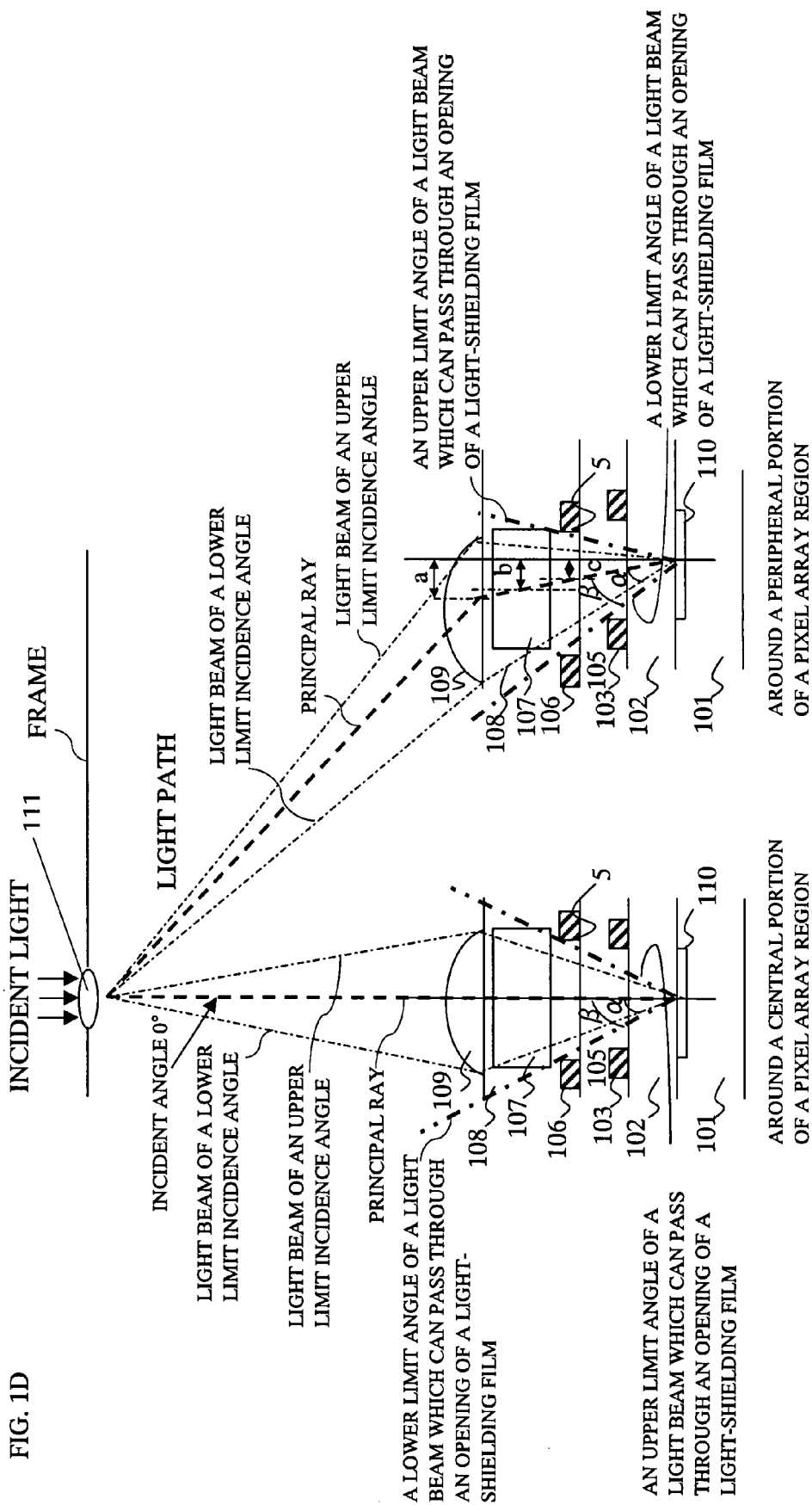
FIG. 1D is a schematic diagram explaining incidence of light into the pixels disposed in the central and a peripheral portions of the pixel array region.

FIG. 1D is a schematic diagram explaining incidence of light into the pixels disposed in the central and a peripheral portions of the pixel array region.

As shown in FIG. 1D, a camera lens 111 is attached to the solid-state image pickup device via a frame or the like. When a center of the camera lens 111 is positioned immediately above the pixel in the central portion of the pixel array, light converged by the camera lens 111 enters the pixel in the central portion of the pixel array substantially in a vertical direction and enters in the pixel in the peripheral portion of the pixel array in an oblique direction.

Therefore, in the pixel in the peripheral portion of the pixel array, in order for more light to enter the photodiode 110, the microlens 109, the second metal film 106, the color filter 107, and the first metal film 103 are each displaced from a central axis of the photodiode to a light source side.

Figure 2A:
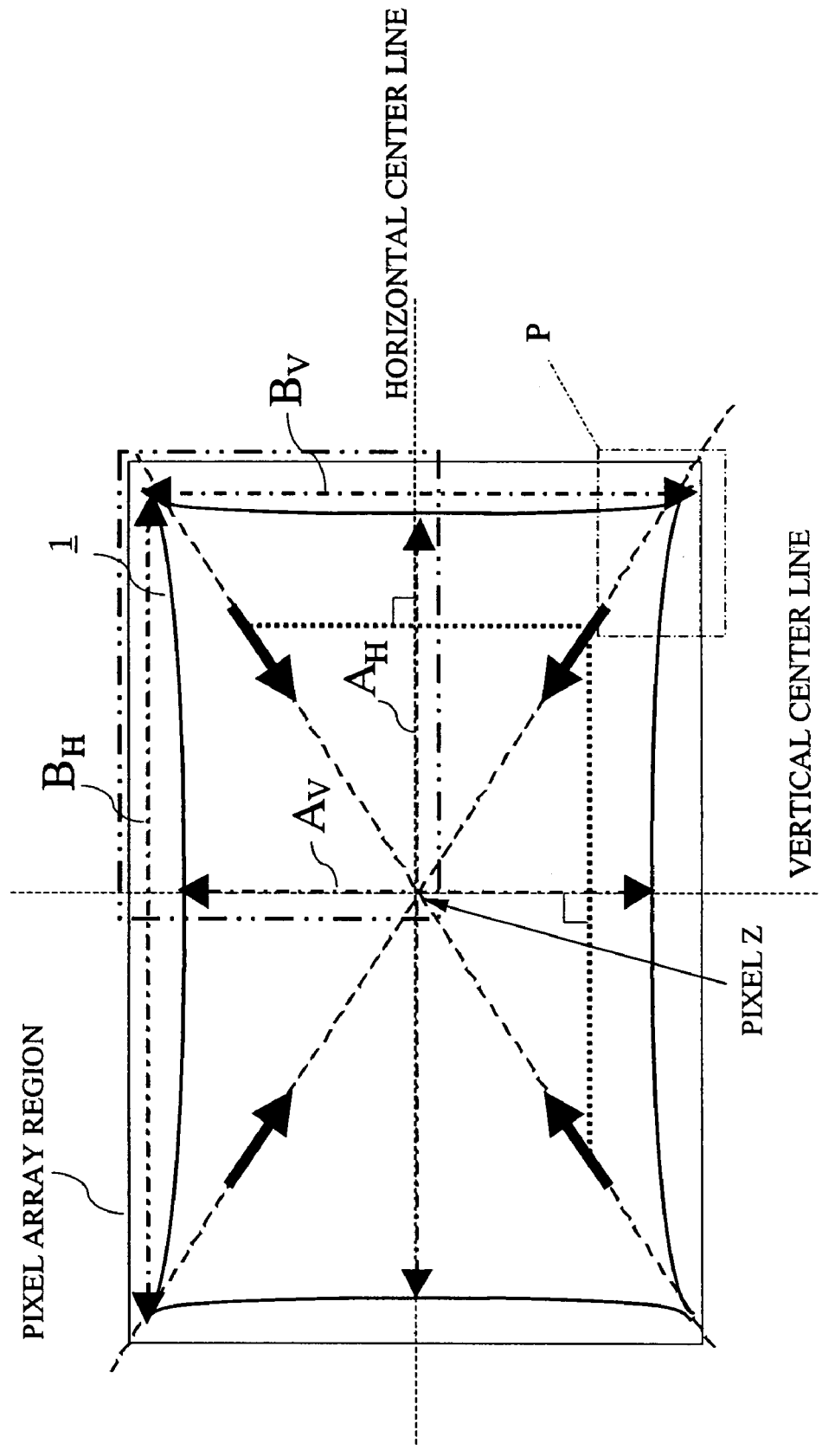
FIG. 2A is a schematic diagram illustrating a layout of microlenses formed in the pixel array region in the solid-state image pickup device according to the first embodiment.
Figure 2B:
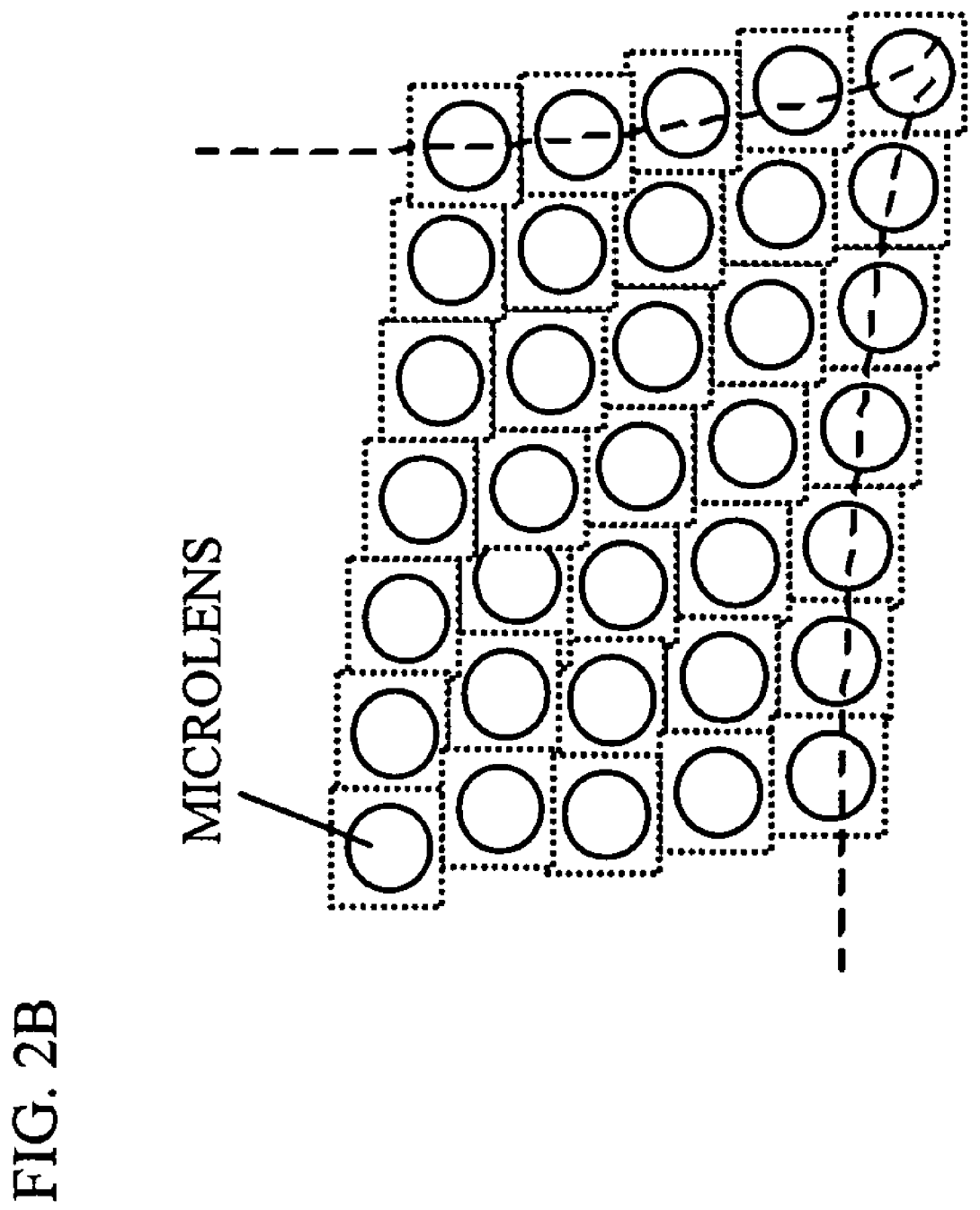
FIG. 2B is a diagram illustrating an enlarged view of the portion "P" shown in FIG. 2A.

FIG. 2A is a schematic diagram illustrating a layout of the microlenses 109 formed in the pixel array region in the solid-state image pickup device according to the first embodiment. FIG. 2B is a diagram illustrating an enlarged view of the portion "P" shown in FIG. 2A.

As described above, the pixel array region 10 includes the plurality of pixels two-dimensionally disposed in a row and a column directions. As shown in FIGS. 2A and 2B, however, although the microlenses 109 are disposed in the two dimensional directions i.e., the row and the column directions, a disposition region 1 where the microlenses 109 are disposed does not have a precise rectangular shape and the outer shape of the disposition region 1 is formed by four curves. More specifically, the disposition region 1 is formed such that each of the four curves constituting the outer shape of the disposition region 1 connects two adjacent vertexes of the disposition region 1 and is concave (toward the center of the pixel array region 10) with respect to a line passing through the two adjacent vertexes.

The shape of the disposition region 1 that is not a precise rectangular shape means that the microlenses 109 are disposed with different pitches, or that the microlenses 109 are not formed at constant intervals, or the microlenses 109 are not uniformly spaced.

Hereinafter, a longitudinal direction in the pixel array region 10 is referred to as an H direction (horizontal direction) and a direction perpendicular to the H direction is referred to as a V direction (vertical direction). Further, a direction along one diagonal line of the pixel array region 10 is referred to as a D1 direction and a direction along another diagonal line of the pixel array region 10 is referred to as a D2 direction.

Figure 3:
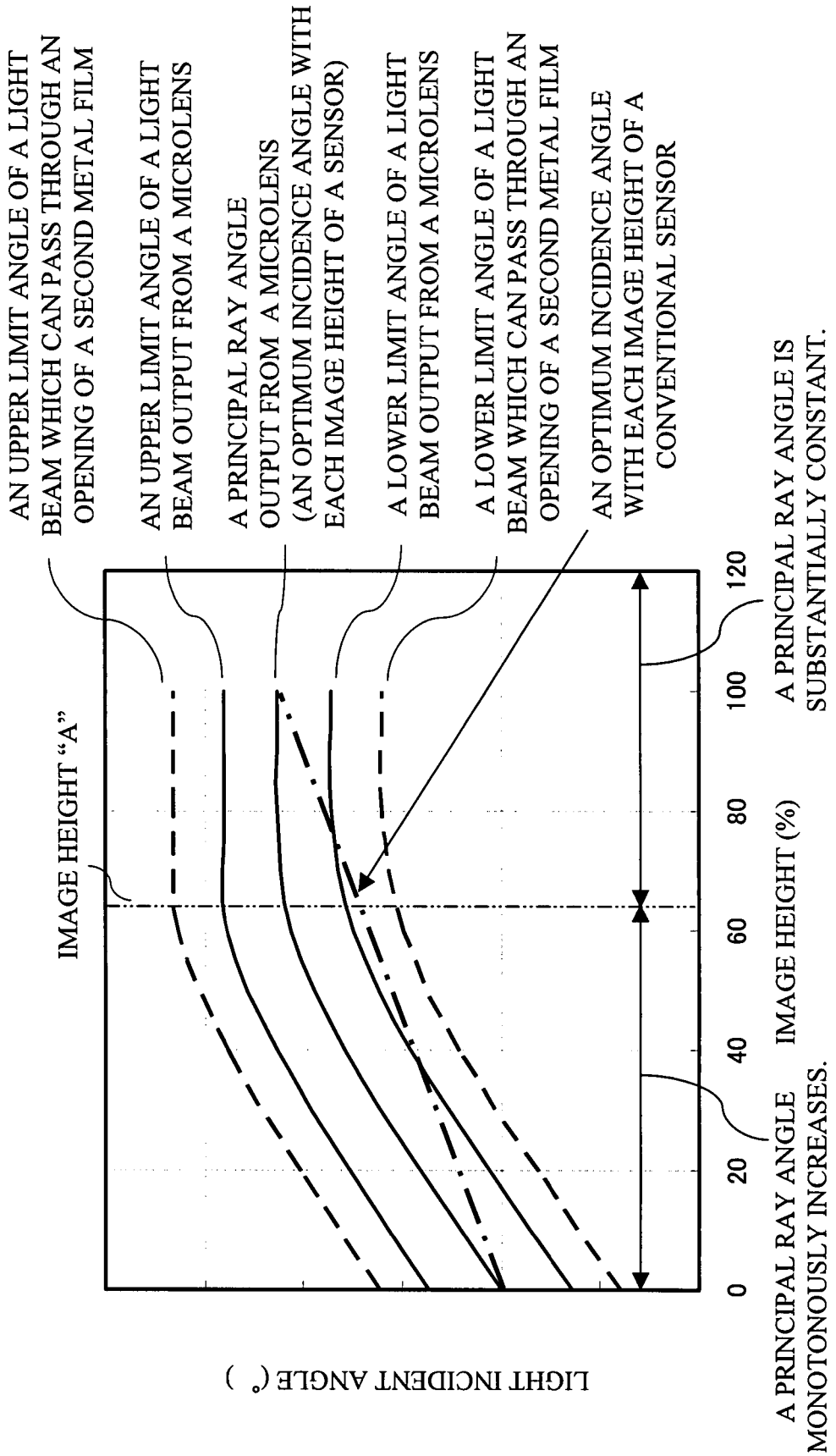
FIG. 3 is a diagram showing a relationship between an image height and an optimum incidence angle for each pixel having each image height.

FIG. 3 is a diagram showing a relationship between an image height and an optimum incidence angle for each pixel having each image height. In FIG. 3, a solid line indicates a relationship between an image height and an optimum incidence angle in a case where a shrink (displacement) method according to the present embodiment is adopted and an alternate long and short dash line indicates a relationship between an image height and an optimum incidence angle in a case where a conventional shrink method is adopted. In FIG. 3, a relationship among a principal ray angle, an upper limit angle, and a lower limit angle of light converged by the camera lens is also shown.

As shown in FIG. 3, an incidence angle of light output from the camera lens increases as an image height increases from zero to a predetermined value. However, when the image height exceeds the predetermined value, an increasing rate of a light incidence angle decreases. As described above, it is understood that an incidence angle of light entering from the camera lens and an image height are not in proportion to each other. Further, it is understood that a difference between an upper limit angle and a lower limit angle of a light beam passing through the opening of the second metal film 106 is greater than a difference between an upper limit angle and a lower limit angle of a light beam passing through the microlens 109.

The reason is, as understood from the structure shown in FIG. 1D, that the second metal film 106 is usually formed below a periphery of the microlens 109 and disposed so as to have sufficient clearance between a light beam passing through the microlens 109 and the edge of the opening of the second metal film 106.

Accordingly, in order to enhance sensitivity of a solid-state image pickup device, it is required to set an angle β shown in FIG. 1D sufficiently larger than an angle α shown in FIG. 1D. Here, the angle α indicates a difference between a lower limit angle and a principal ray angle of a light beam passing through the microlens 109 and the angle β shows a difference between a lower limit and a principal ray angle of a light beam passing through the opening of the second metal film 106.

However, in the conventional shrink method, since the microlenses 109 are disposed with constant pitches in an entire area of the pixel array region, an optimum incidence angle for each of the pixels increases in proportion to an image height. Accordingly, in the conventional solid-state image pickup device, a principal ray angle for the camera lens and an optimum incidence angle for each of the pixels greatly differ from each other.

In contrast, the shrink method according to the present embodiment is characterized in that a displacement amount is optimized so that an incident angle for the camera lens matches with an optimum incidence angle for each of the pixels without relation to an image height. As a result, in every image height in the pixel array region, the shrink method according to the first embodiment can realize an enhancement of a light-gathering efficiency, as compared with the conventional shrink method.

Features in a layout of the present embodiment are as follows. When an image height is in a range of 0% to A %, pitches between the microlenses 109 are small. When an image height is in a range of A % to 100%, pitches between the microlenses 109 are large. Therefore, around four corners of the microlens disposition region having a large image height, pitches between the microlenses 109 are large. A layout of the microlenses 109 of the present embodiment, as shown in FIG. 2A, has both or either of the following two features: a distance $B_H$ in the H direction between neighboring vertexes is larger than a width $A_H$ of a central portion of the pixel array; and a distance $B_V$ in the V direction between neighboring vertexes is larger than a height $A_V$ of a central portion of the pixel array. Here, "A(%)" is a value determined by incidence angle characteristics of the camera lens.

In the present embodiment, the incidence angle of light output from the microlense 109 and an optimum incidence angle for the pixel corresponding to the microlens 109 are not necessarily required to precisely match with each other over the entire of the pixel array region and when the incidence angle output from the microlense 109 and an optimum incidence angle for the pixel approximately matches with each other, sufficient effect of enhancing the light-gathering efficiency can be attained. When a difference in the angles is below about 3°, the sufficient effect of enhancing the light-gathering efficiency can be attained. If the difference in the angles is equal to or greater than 3°, a reduction in sensitivity may be caused.

Usually, when cells are disposed in a design process of a microlens array by using a CAD layout tool, there exists a constraint of minimum grid scale (usually in an approximate range of 0.0005 to 0.005 μm).

However, in order for the incidence angle characteristics of the camera lens and the optimum incidence angle for each of the pixels to precisely match with each other, a grid having a scale equal to or less than the minimum grid scale is required for designing a layout. When pitches between microlenses are equal to or less than minimum grid scale, a difference between an incidence angle for each of the microlenses and an incidence angle for each of the pixels is equal to or less than 0.1°, and have little influence on a light-gathering efficiency.

In this case, since pitches between the microlenses 109 are set by using the CAD layout tool, the pitches may change in a stepwise manner.

In a case where a top priority is given to sensitivity characteristic of a solid-state image pickup device, it is preferable that such a disposition method in which the microlenses 109 are displaced is also adopted similarly for the second metal film 106 and the color filter 107. This is because due to fluctuations (positional deviation, fluctuation in a film thickness, etc.) occurring in processes of manufacturing the microlenses 109, the color filter 107, and the second metal film 106, the second metal film 106 may block light entering from the microlenses. It is also considered that there accrues a problem of color mixture occurring when a light beam passes through, not a color filter 107 through which a light beam should pass, another kind of a color filter 107 which is adjacently disposed.

Accordingly, in a case where a top priority is given to sensitivity and/or saturation characteristics of the image pickup device, such problems can be solved by also adopting the above-mentioned disposition method, in which the microlenses 109 are displaced, similarly for the second metal film 106 and the color filter 107. In this case, similarly to in the conventional method, it is preferable that amounts a, b, and c of displacing the microlens 109, the color filter 107, and the second metal film 106 toward a light source side satisfy a relationship a>b>c.

As a method for designing a layout of the microlenses 109, considered are a method in which patterns are drawn by using CAD in a collective manner and a method in which predetermined patterns are drawn on a mask at a plurality of times by using electron beam lithography.

The method in which patterns are drawn by using CAD in a collective manner is suited to the solid-state image pickup device according to the present embodiment. The reason is that in the present embodiment, pitches between the microlenses 109 are required to be precisely controlled so as to match with a minimum scale (approximately 0.001 μm, usually) of the CAD layout tool and it is difficult for the method, in which predetermined patterns are drawn on a mask at a plurality of times by using electron beam lithography, to control in such a manner.

Alternatively, there may be a method in which one part of a layout having a rectangular shape is shrunk and drawn on a mask by using the electron beam lithography and another part of the layout having the rectangular shape is previously shrunk by CAD to produce drawing data to be drawn on a mask. Whereas the electron beam lithography achieves a high resolution obtained upon shrinking, drawing a plurality of patterns on one mask many times may cause positional deviation. On the other hand, although a resolution is low when using the CAD, the number of times at which drawing on a mask is repeated can be reduced, leading to an advantage of reducing positional deviation.

Here, disposition of the second metal film 106, the color filter 107, and the microlenses 109 in the solid-state image pickup device according to the first embodiment, that is, displacement amounts of those elements will be described in detail with reference to FIGS. 3, and 4A to 4C.

Figure 4A:
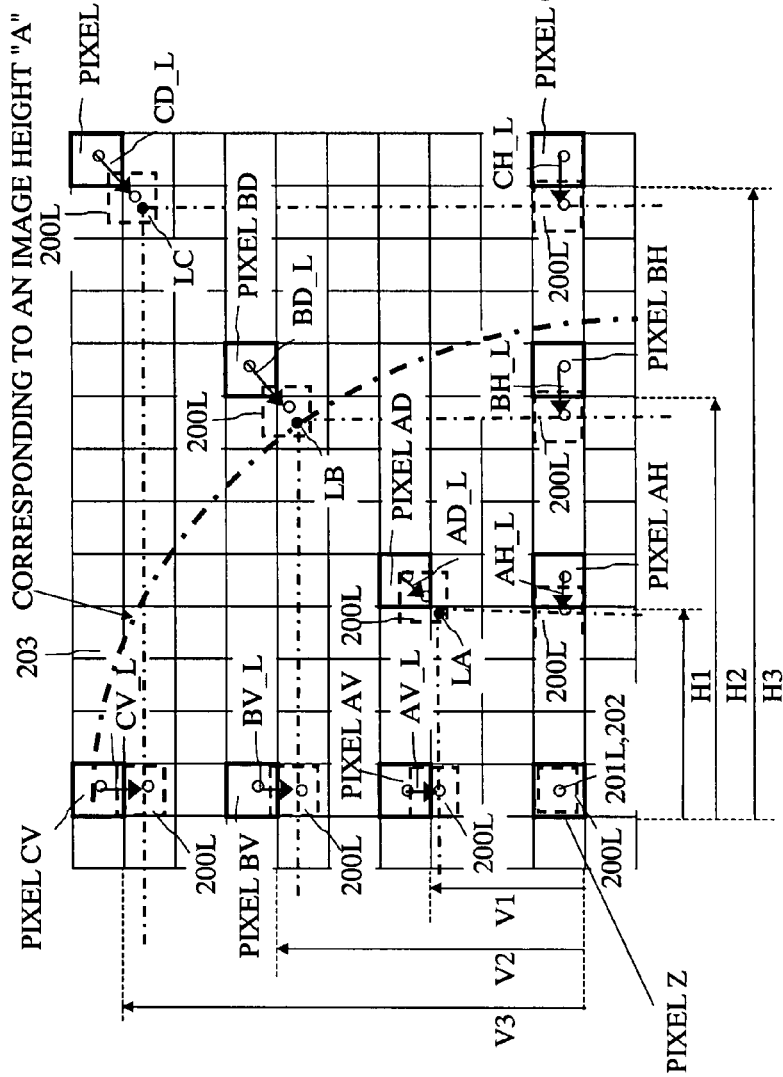
FIG. 4A is a schematic diagram showing displacement amounts of the microlenses in detail.
Figure 4B:
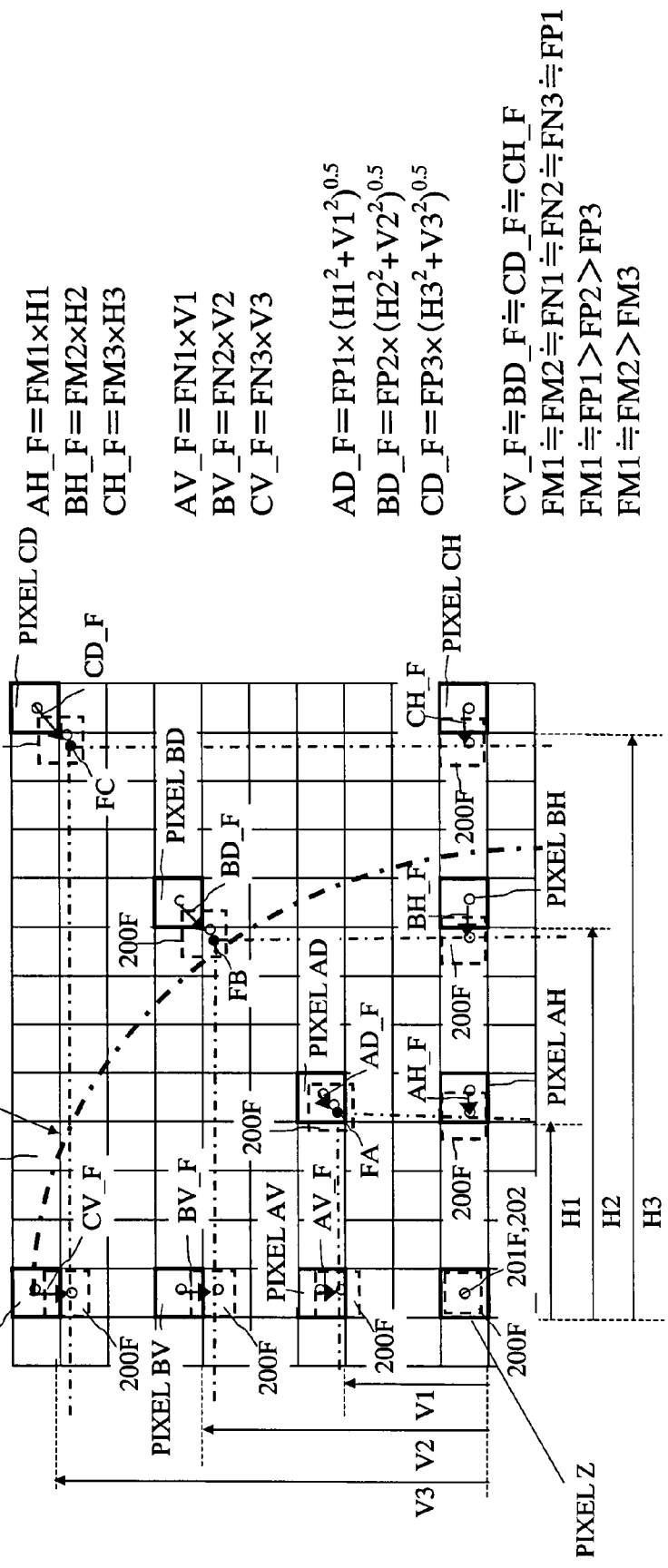
FIG. 4B is a schematic diagram showing displacement amounts of color filters in detail.
Figure 4C:
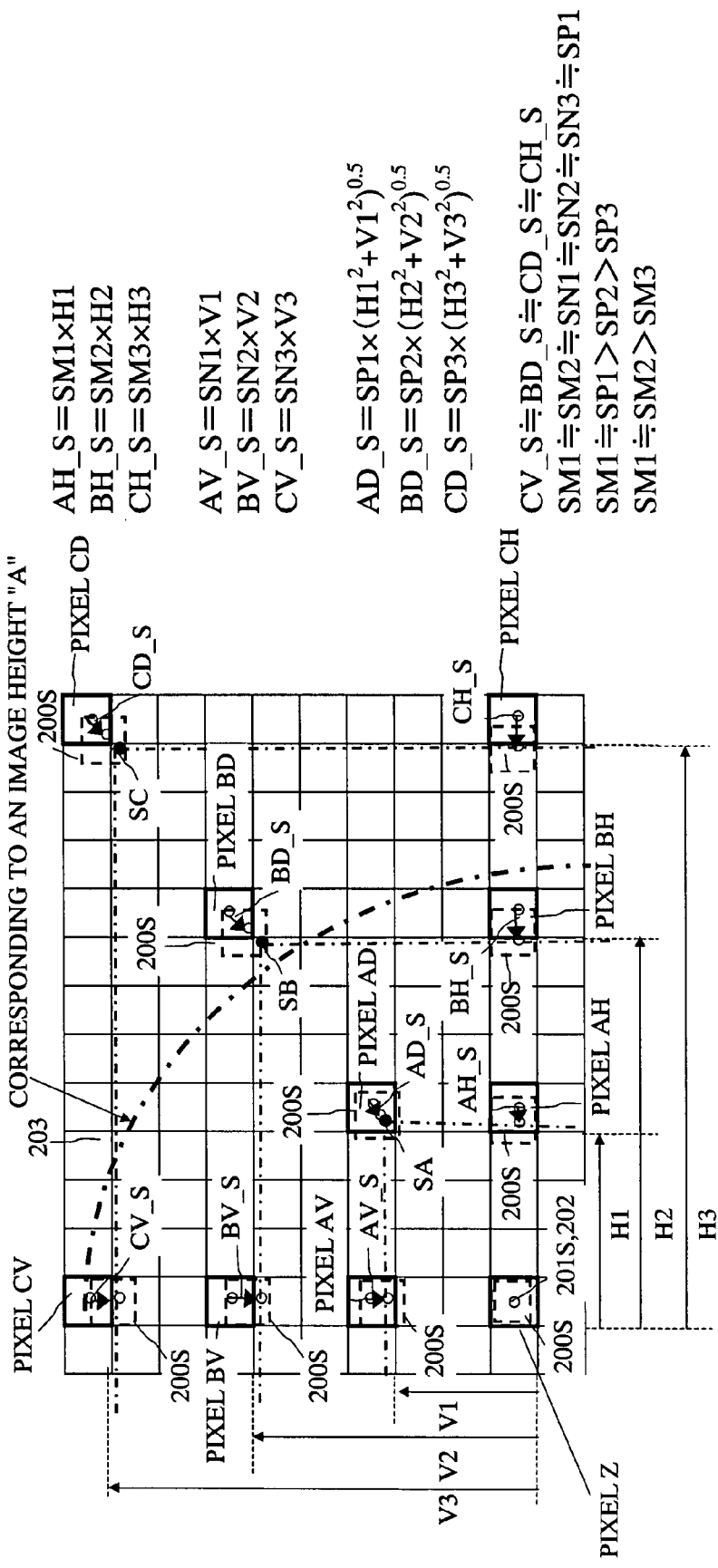
FIG. 4C is a schematic diagram showing displacement amounts of second metal films in detail.

FIG. 4A is a schematic diagram showing the displacement amounts of the microlenses 109 in detail, FIG. 4B is a schematic diagram showing the displacement amounts of the color filters 107 in detail, and FIG. 4C is a schematic diagram showing the displacement amounts of the second metal films 106 in detail. In FIGS. 4A to 4C, a thick alternate long and short dashed line indicates a line drawn when an image height is A %.

FIGS. 4A to 4C show displacement amounts, displacement directions, and a displacement method of the microlenses 109, the color filters 107, and the second metal films 106, in a quadrangle which is indicated by an alternate long and two short dashes line and is a part of the pixel array region shown in FIG. 2A.

Displacement amounts and displacement directions of the microlenses 109, the color filters 107, and the second metal films 106 in the pixel array region in FIG. 2A are symmetrical to the displacement amounts and displacement directions shown in FIG. 4A, with respect to a horizontal center line and a vertical center line.

In FIGS. 4A to 4C, some pixels (a pixel Z, pixels AH to CH, pixels AV to CV, and pixels AD to CD) among pixels disposed in the pixel array region are shown in detail. The pixel Z is disposed in a central portion of the pixel array region and in the pixel Z, the microlens 109, the color filter 107, and the second metal film 106 are not displaced with each other. The pixels AH, BH, and CH indicate pixels disposed in positions distant from the pixel Z in a horizontal direction toward a peripheral portion, respectively. The pixels AV, BV, and CV indicate pixels disposed in positions distant from the pixel Z in a vertical direction toward the peripheral portion, respectively. Further, the pixels AD, BD, and CD indicate pixels disposed in positions distant from the pixel Z in an oblique direction toward the peripheral portion, respectively.

Although in the figures, the pixel Z is supposed to be a pixel in the central portion of the pixel array region, the pixel in which the microlens 109, the color filter 107, and the second metal film 106 are not displaced with each other may be provided at a portion of the pixel array region other than the central portion of the pixel array region in the present embodiment.

The plurality of pixels Z, AH, BH, AV, BV, CV and AD (pixels disposed inside of a portion indicated by the thick alternate long and short dashed line) shown in detail in FIGS. 4A to 4C have image heights in a range of 0% to A %. The pixels CH, BD, and CD (pixels disposed outside of the portion indicated by the thick alternate long and short dashed line) have image heights in a range of A % to 100%.

In FIG. 4A, quadrangles drawn by a thick solid line indicate positions of the photodiodes and quadrangles drawn by a broken line indicate positions of the microlenses 109. Here, displacement amounts of the microlenses 109 (i.e., distances between centers of the photodiodes and centers of the microlenses 109) in the pixels AH, BH, and CH are shown as AH_L, BH_L, and CH_L, respectively. Displacement amounts of the microlenses 109 in the pixels AV, BV, and CV are shown as AV_L, BV_L, and CV_L, respectively. Displacement amounts of the microlenses 109 in the pixels AD, BD, and CD are shown as AD_L, BD_L, and CD_L, respectively.

In FIG. 4B, quadrangles drawn by a thick solid line indicate positions of the photodiodes and quadrangles drawn by a broken line indicate positions of the color filters 107. Here, displacement amounts of the color filters 107 (i.e., distances between centers of the photodiodes and centers of the color filters 107) in the pixels AH, BH, and CH are shown as AH_F, BH_F, and CH_F, respectively. Displacement amounts of the color filters 107 in the pixels AV, BV, and CV are shown as AV_F, BV_F, and CV_F, respectively. Displacement amounts of the color filters 107 in the pixels AD, BD, and CD are shown as AD_F, BD_F, and CD_F, respectively.

In FIG. 4C, quadrangles drawn by a thick solid line indicate positions of the photodiodes and quadrangles drawn by a broken line indicate positions of the second metal films 106. Here, displacement amounts of the second metal films 106 (i.e., distances between centers of the photodiodes and centers of openings formed in the second metal films 106) in the pixels AH, BH, and CH are shown as AH_S, BH_S, and CH_S, respectively. Displacement amounts of the second metal films in the pixels AV, BV, and CV are shown as AV_S, BV_S, and CV_S, respectively. Displacement amounts of the second metal films in the pixels AD, BD, and CD are shown as AD_S, BD_S, and CD_S, respectively.

Each of the above-mentioned displacement amounts in the respective figures is calculated by multiplying each of distances (e.g., H1, H2, H3, V1, V2, and V3) between a center 201L of the pixel Z and a center 200L of each of the pixels by each of predetermined coefficients (any of LM1 to LM3, LN1 to LN3, and LP1 to LP2) respectively, in accordance with formulas shown in the respective figures. The coefficients (for example, LM1, LM2 and the like) are determined in accordance with characteristics of the camera lens.

As shown in FIG. 3, as the characteristics of the camera lens used with the solid-state image pickup device according to the present embodiment, a principal ray angle of a light beam passing through the camera lens monotonously increases when an image height is in a range of 0% to A % and is substantially constant when an image height is in a range of A % to 100%. As characteristics of a general camera lens, an image height A is usually in a range of 60% to 80%.

Therefore, in the solid-state image pickup device according to the present embodiment, shrink is performed for the microlenses 109 so that in accordance with a change in the principal ray angle, the displacement amount of the microlens 109 monotonously increases when the image height is in a range of 0% to A % and is substantially constant when the image height is equal to or greater than A %.

Specifically, with respect to pixels disposed in a region whose image height is in a range of 0% to A %, it is possible to make an absolute value, of a displacement amount between a center 200L of each of the pixels and a center 201L of a microlens 109, be substantially in proportion to an image height by making each of the coefficient (LM1, LM2, LN1, LN2, LN3, and LP1) constant. And with respect to pixels disposed in a region whose image height is equal to or greater than A %, the respective coefficients are set so as to satisfy relationships of the following formulas 1 to 3.

$$LM1 \approx LM2 \approx LN1 \approx LN2 \approx LN3 \quad \text{[Formula 1]}$$

$$LM1 \approx LP1 > LP2 > LP3 \quad \text{[Formula 2]}$$

$$LM1 \approx LM2 > LM3 \quad \text{[Formula 3]}$$

In the solid-state image pickup device according to the present embodiment, by setting values of the respective coefficients in such a manner, the displacement amounts (CH_L, BD_L, CD_L, and CV_L) of the pixels whose image heights are greater than A % can be made substantially constant.

In other words, the respective displacement amounts CH_L, BD_L, CD_L, and CV_L satisfy a relationship of CH_L≈BD_L≈CD_L≈CV_L. And the other displacement amounts satisfy relationships of AH_L<BH_L, AV_L<BV_L<CV_L, BH_L≦CV_L, and AD_L≦BD_L.

With respect to pixels disposed in a region whose image height is equal to or greater than A %, the respective coefficients shown in FIG. 4B are set so as to satisfy relationships of the following formulas 4 to 6.

$$FM1 \approx FM2 \approx FN1 \approx FN2 \approx FN3 \quad \text{[Formula 4]}$$

$$FM1 \approx FP1 > FP2 > FP3 \quad \text{[Formula 5]}$$

$$FM1 \approx FM2 > FM3 \quad \text{[Formula 6]}$$

In the solid-state image pickup device according to the present embodiment, by setting values of the respective coefficients in such a manner, the displacement amounts (CH_F, BD_F, CD_F, and CV_F) of the pixels whose image heights are greater than A can be made substantially constant.

In other words, the respective displacement amounts CH_F, BD_F, CD_F, and CV_F satisfies a relationship of CH_F≈BD_F≈CD_F≈CV_F. And the other displacement amounts satisfy relationships AH_F<BH_F, AV_F<BV_F<CV_F, BH_F≦CV_F, and AD_F ≦BD_F.

With respect to pixels disposed in a region whose image height is equal to or greater than A %, the respective coefficients shown in FIG. 4C are set so as to satisfy relationships of the following formulas 7 to 9.

$$SM1 \approx SM2 \approx SN1 \approx SN2 \approx SN3 \quad \text{[Formula 7]}$$

$$SM1 \approx SP1 > SP2 > SP3 \quad \text{[Formula 8]}$$

$$SM1 \approx SM2 > SM3 \quad \text{[Formula 9]}$$

In the solid-state image pickup device according to the present embodiment, by setting values of the respective coefficients in such a manner, the displacement amounts (CH_S, BD_S, CD_S, and CV_S) of the pixels whose image heights are greater than A can be made substantially constant.

In other words, the respective displacement amounts CH_S, BD_S, CD_S, and CV_S satisfies a relationship of CH_S_≈BD_S≈CD_S≈CV_S. And the other displacement amounts satisfy relationships AH_S<BH_S, AV_S<BV_S<CV_S, BH_S≦CV_S, and AD_S≦BD_S.

The first metal films 103 may be also disposed so as to be displaced from the centers of the photodiodes by displacement amounts obtained through similar calculations performed for obtaining the displacement amounts of the microlenses 109, the color filters 107, and the second metal films 106.

Second Embodiment

Figure 5A:
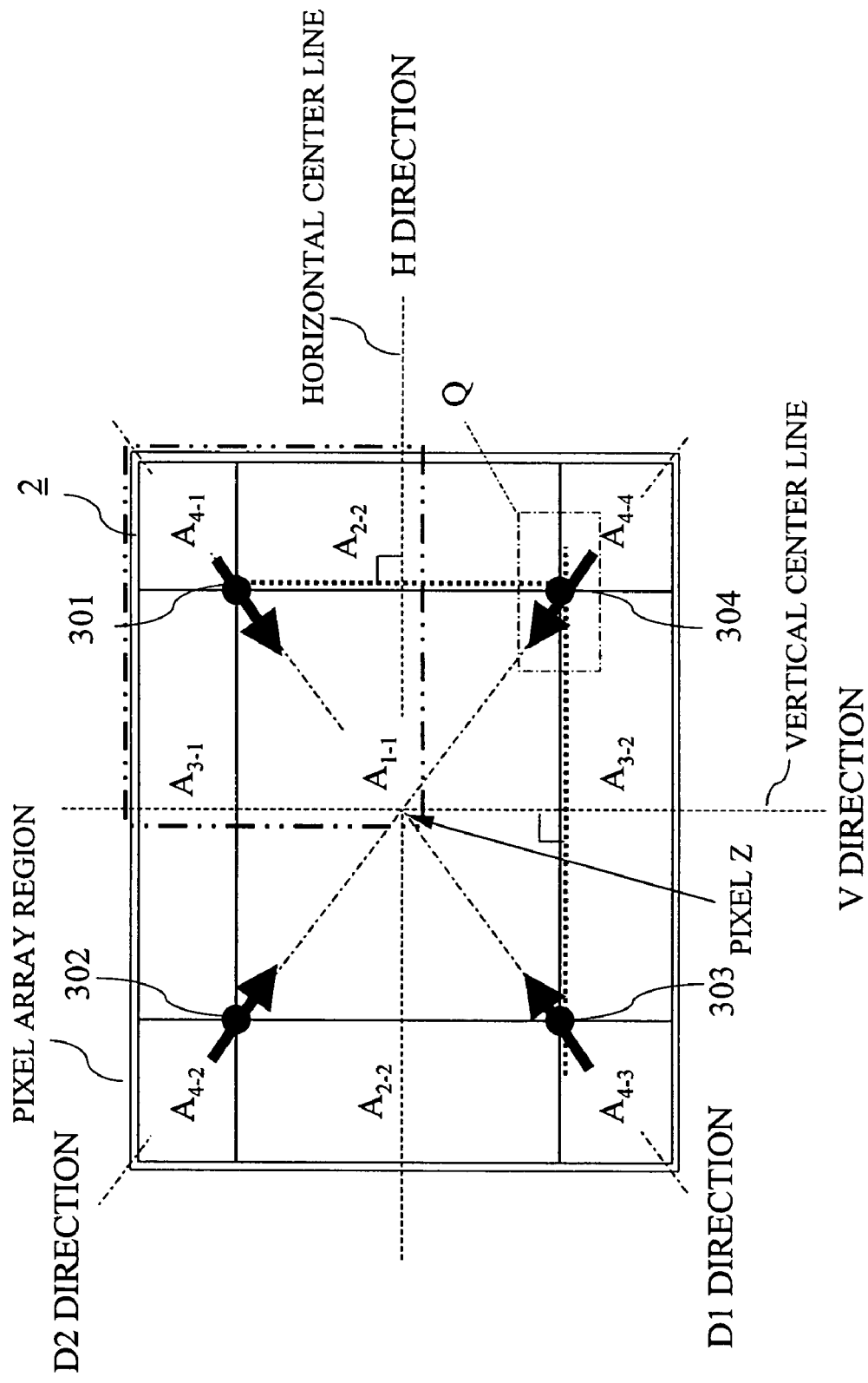
FIG. 5A is a schematic diagram illustrating a layout of the microlenses in a solid-state image pickup device according to a second embodiment of the present invention.
Figure 5B:
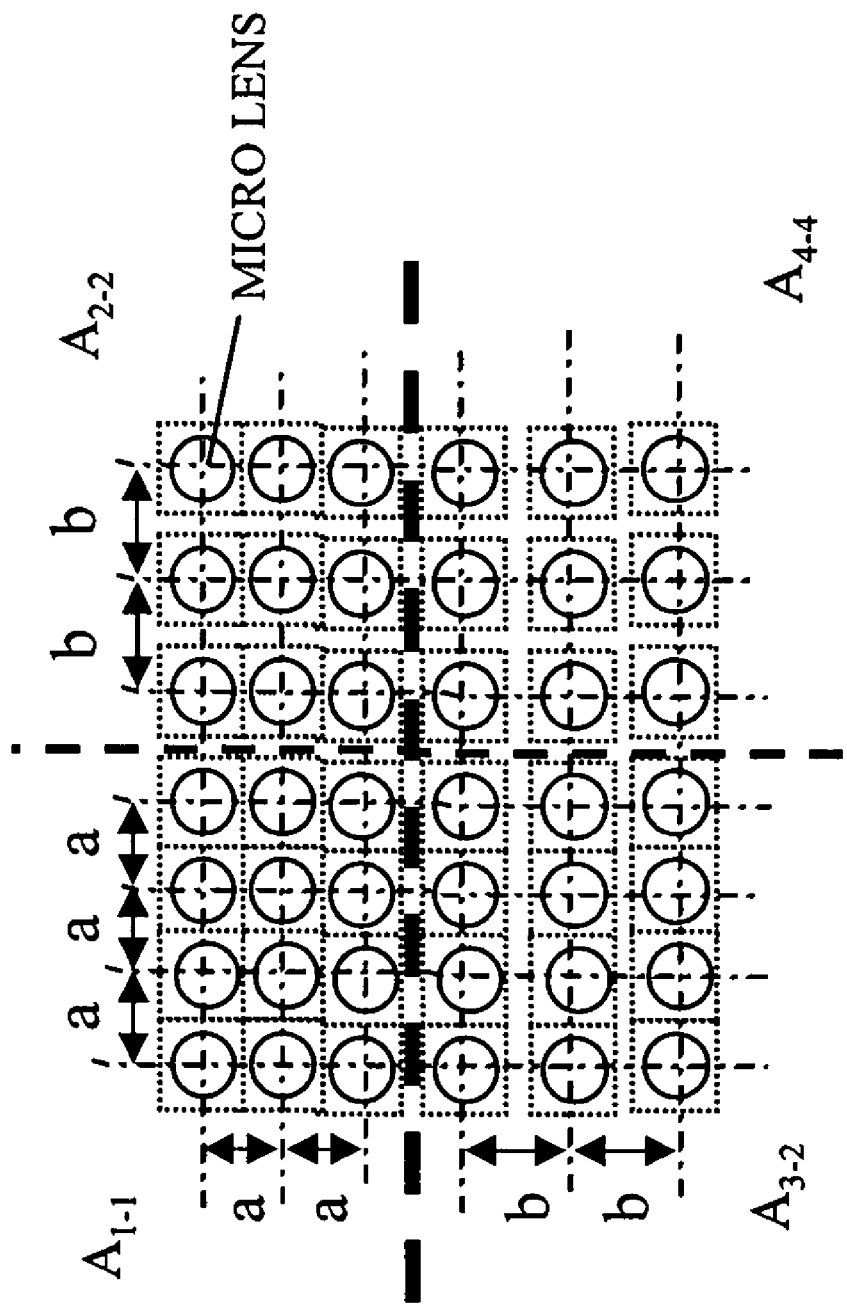
FIG. 5B is a diagram illustrating an enlarged view of the portion "Q" shown in FIG. 5A.
Figure 6:
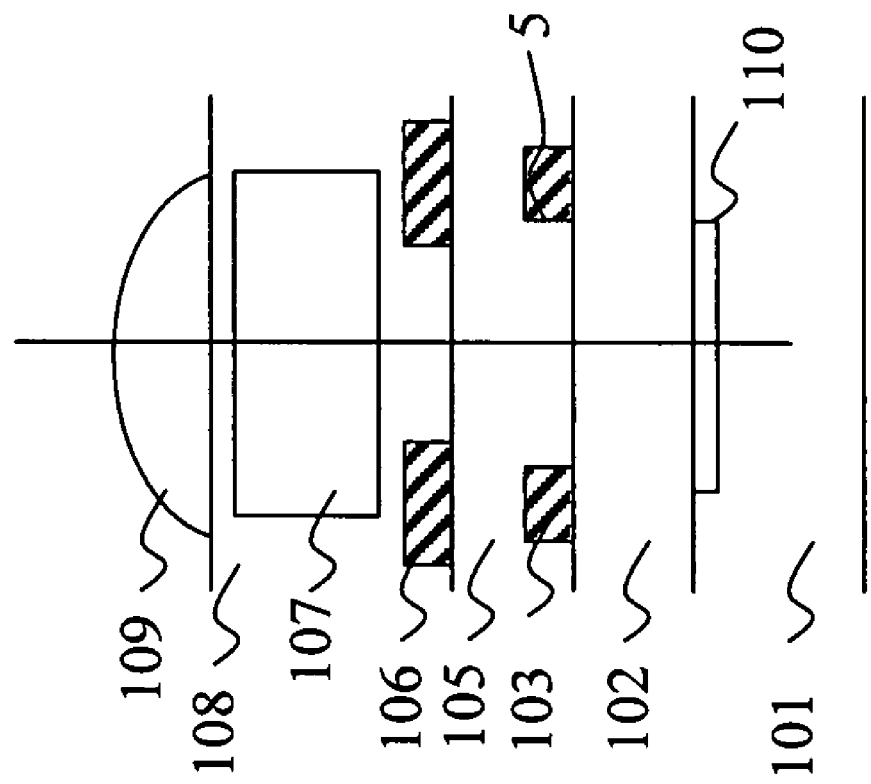
FIG. 6 is a diagram illustrating a cross-sectional view of a pixel disposed in a central portion of a pixel array region.

FIG. 5A is a schematic diagram illustrating a layout of microlenses 109 in a solid-state image pickup device according to a second embodiment and FIG. 5B is a diagram illustrating an enlarged view of the portion "Q" shown in FIG. 5A. FIG. 6 is a diagram illustrating a cross-sectional view of a pixel disposed in a central portion of a pixel array region.

Since a circuit configuration of the solid-state image pickup device according to the present embodiment is same as that of the solid-state image pickup device according to the first embodiment shown in FIGS. 1A and 1B, descriptions on the circuit configuration will be omitted here.

The solid-state image pickup device according to the present embodiment has a structure similar to that of the solid-state image pickup device according to the first embodiment shown in FIG. 1D, except displacement amounts of microlenses 109, color filters 107, and second metal films 106. In other words, as shown in FIGS. 1D and 6, pixels are formed on a surface of a semiconductor substrate 101, each of which includes a photodiode 110 serving as a photoelectric conversion region, an insulating film 102 formed so as to cover a surface of the photodiode 110, a first metal film 103 formed so as to cover a surface of the insulating film 102, an insulating film 105 formed so as to cover a surface of the first metal film 103, a second metal film 106 formed so as to cover a surface of the insulating film 105 and having an opening 5 formed above the photoelectric conversion region, the color filter 107 formed so as to cover the opening 5 of the second metal film 106, an insulating film 108, and the microlens (top lens) 109 for converging light into the photoelectric conversion region. In a predetermined position of the pixel, a metal-embedded region (not shown) is formed. And a readout circuit (not shown) for reading out a signal from the photoelectric conversion region is provided in each of the pixels. The insulating films 102, 105, and 108 are not necessarily made of the same material. For example, the insulating films 102 and 105 may be made of silicon oxide or silicon oxynitride. The insulating film 108 may be made of resin such as acrylate resin. When refractive indices of the materials of two contacting insulating films are different from each other, an interface between the two contacting insulating films reflects incident light, whereby the amount of the incident light entering into the photodiode 110 is reduced. Therefore, it is preferable to minimize the difference of refractive indices of the two contacting insulating films. In general, when the difference of the refractive indices ranges from 0.1 to 0.3, the reduction in the amount of light caused by the reflection at the interface is small.

When a plurality of layers of metal films are formed on a surface of the semiconductor substrate 101, the second metal film 106 is formed in an uppermost layer. There are cases where the second metal film 106 formed in the uppermost layer has a function of a wire and where the second metal film 106 formed in the uppermost layer has only a function of a light shielding film with no function of a wire. In the present embodiment, the second metal film 106 may be in either of the cases.

A disposition region 2, shown in FIG. 5A, where a plurality of microlenses 109 are two-dimensionally disposed in a row and a column directions, is of a rectangular shape.

The solid-state image pickup device according to the present embodiment is characterized in that a disposition region 2 for the microlenses 109 is divided into a plurality of partial regions having rectangular shapes (rectangular geometries) and a displacement pitch between the microlenses 109 is set for each of the divided partial regions. In FIG. 5A, in order to facilitate understanding, each of the partial regions structuring the pixel array region is indicated by a solid line and directions are indicated by an alternate long and short dashed line.

Although in the figures, a pixel Z is supposed to be a pixel in the central portion of the pixel array region, the pixel in which the microlens 109, the color filter 107, and the second metal film 106 are not displaced with each other may be provided in a portion a pixel other than the central portion of the pixel array region in the present embodiment.

The disposition region 2 for the microlenses 109 comprises nine partial regions having the rectangular shapes.

More specifically, the disposition region 2 for the microlenses 109 includes a partial region $A_{1-1}$ having a plurality of pixels disposed in a rectangular area in a central portion of the disposition region 2, and eight partial regions $A_{2-1}$ to $A_{4-4}$, each of which has a plurality of pixels disposed in a rectangular area and is located outside of the partial region $A_{1-1}$.

The partial regions $A_{2-1}$ and $A_{2-2}$ are aligned with the partial region $A_{1-1}$ in the H direction and share sides with the partial region $A_{1-1}$. The partial regions $A_{3-1}$ and $A_{3-2}$ are aligned with the partial region $A_{1-1}$ in the V direction and share sides with the partial region $A_{1-1}$. The partial regions $A_{4-1}$ to $A_{4-4}$ are disposed in four corners of the disposition region 2 and share vertexes 301 to 304 with the partial region $A_{1-1}$.

Further, in the present embodiment, the partial region $A_{1-1}$ disposed in the central portion of the disposition region 2 for the microlenses 109 is arranged so that the vertexes 301 to 304 are positioned on diagonal lines of the disposition region 2. Note that positions of the vertexes 301 to 304 of the partial region $A_{1-1}$ are determined in consideration of incident light characteristics of the camera lens.

Here, pitches between microlenses 109 disposed in each of the partial regions included in the disposition region 2 will be described.

The microlenses 109 in a same partial region are disposed so as to have constant pitches both in the H and V directions. However, the pitches of the microlenses 109 in one of the partial regions and those in another partial region adjacent to the one of the partial regions are different from each other at least in one of the H and V directions.

More specifically, as shown in FIG. 5B, the microlenses 109 in the partial region $A_{1-1}$ in the central portion of the disposition region 2 are disposed so as to have constant pitches "a" both in the H and V directions. The pitch "a" between the microlenses 109 is set so as to be shorter than a pitch for disposing the photodiodes.

Next, pitches between the microlenses 109 in the partial regions $A_{4-1}$ to $A_{4-4}$ positioned in the four corners of the disposition region 2 are constant both in the H and V directions and are often set so as to be longer than the pitch between the microlenses 109 in the partial region $A_{1-1}$. In the present embodiment, as shown in FIG. 5B, the microlenses 109 in the partial regions $A_{4-1}$ to $A_{4-4}$ are disposed so as to have constant pitches "b" both in the H and V directions.

Next, pitches in the H direction between the microlenses 109 in the partial regions $A_{2-1}$ and $A_{2-2}$ neighboring the partial region $A_{1-1}$ in the H direction are set so as to be same as those in the partial region $A_{4-1}$. Pitches in the V direction between the microlenses 109 in the partial regions $A_{2-1}$ and $A_{2-2}$ are set so as to be same as those in the partial region $A_{1-1}$. In other words, as shown in FIG. 5B, the microlenses 109 in the partial regions $A_{2-1}$ and $A_{2-2}$ are disposed so as to have the constant pitches "b" in the H direction and the constant pitches "a" in the V direction.

Pitches in the H direction between the microlenses 109 in the partial regions $A_{3-1}$ and $A_{3-2}$ neighboring the partial region $A_{1-1}$ in the V direction are set so as to be same as those in the partial region $A_{1-1}$. Pitches in the V direction between the microlenses 109 in the partial regions $A_{3-1}$ and $A_{3-2}$ are set so as to be same as those in the partial region $A_{4-1}$. In other words, as shown in FIG. 5B, the microlenses 109 in the partial regions $A_{3-1}$ and $A_{3-2}$ are disposed so as to have the constant pitches "a" in the H direction and the constant pitches "b" in the V direction.

Figure 7:
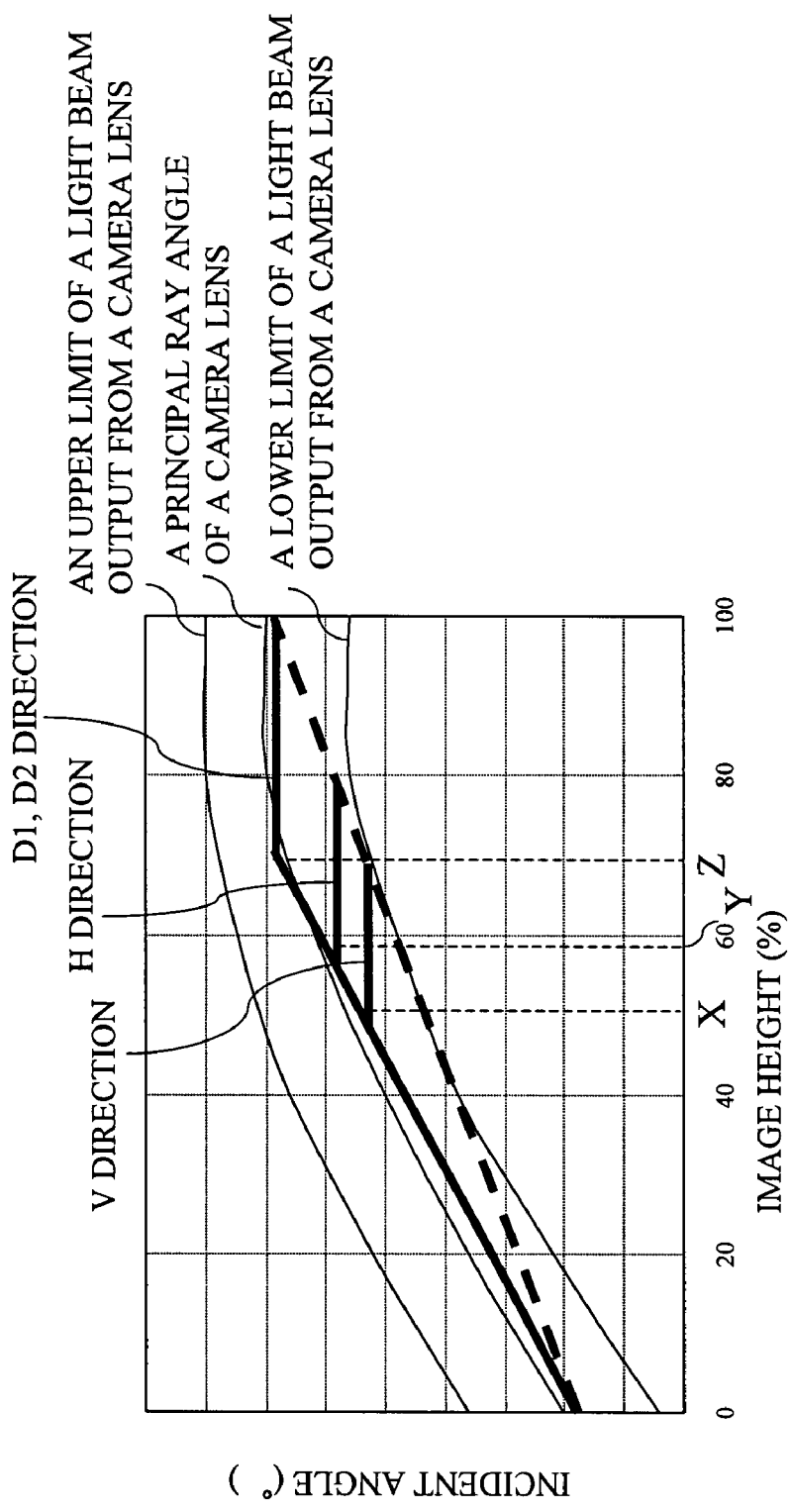
FIG. 7 is a diagram showing a relationship between an image height and an optimum incidence angle for pixels.

FIG. 7 is a diagram showing a relationship between an image height and an optimum incidence angle for pixels. In FIG. 7, a thick solid line indicates a relationship between an image height and an optimum incidence angle in a case where a shrink method according to the present embodiment is adopted and a broken line indicates a relationship between an image height and an optimum incidence angle in a case where the conventional shrink method is adopted. In FIG. 7, a relationship among a principal ray angle, an upper limit angle, and a lower limit angle of light converged by the camera lens is also shown.

As shown in FIG. 7, an incidence angle of light output from the camera lens increases as an image height increases from zero to a predetermined value. However, when the image height exceeds the predetermined value, an increase rate of a light incidence angle decreases. As described above, it is understood that an incidence angle of light entering from the camera lens and an image height are not in proportion to each other.

In the conventional shrink method, since the microlenses 109 are disposed with constant pitches in an entire area of the pixel array region, an optimum incidence angle for each of the pixels increases in proportion to an image height, as shown by the broken line in FIG. 7. Accordingly, in the conventional solid-state image pickup device, a principal ray angle for the camera lens and an optimum incidence angle for each of the pixels greatly differ from each other.

In contrast, in the solid-state image pickup device according to the present embodiment, division of the pixel array region shown in FIG. 5A and the pitches between the microlenses 109 in each of the divided partial regions are determined in consideration of a relationship between an incidence angle of light entering from the camera lens and an image height.

More specifically, when an image height which causes a change in an increasing rate of an incidence angle of light output from the camera lens is assumed to be Z%, each image height at each of the vertexes 301 to 304 in the partial region $A_{1-1}$ shown in FIG. 5A may be set to be Z%. Usually, in the pixel array region, a proportion of a length of a side in the H direction to a length of a side in the V direction is 4:3. When Z is set to be 60%, X is 36% and Y is 48%.

In addition, the pitches between the microlenses 109 in each of the partial regions are set based on an image height and a principal ray angle of the camera lens. Usually, the pitches between the microlenses 109 in the partial region $A_{4-1}$ are set to be longer than those between the microlenses 109 in the partial region $A_{1-1}$. Accordingly, a shrink rate in the partial region $A_{1-1}$ differs from that in the partial region $A_{4-1}$.

As a result, as shown by the solid line in FIG. 7, in the shrink method according to the present embodiment, an optimum incidence angle for each of the pixels in a region where an image height in the H direction is equal to or greater than X and in a region where an image height in the V direction is equal to or greater than Y slightly differs from a principal ray angle of the camera lens. However, an optimum incidence angle for each of the pixels in the D1 and D2 directions (in other words, the directions along the diagonal lines in the pixel array region) substantially matches with the principal ray angle of the camera lens. Accordingly, the solid-state image pickup device according to the present embodiment allows enhancing a light-gathering efficiency for the pixels in the D1 and D2 directions, thereby suppressing shading.

In the shrink method according to the present embodiment, in the D1 and D2 directions, the light-gathering efficiency with respect to a light incidence amount is high both in the central and the peripheral portions of the pixel array region. Also in the H and the V directions, the light-gathering efficiency obtained by the shrink method according to the present embodiment is equivalent to that obtained by the conventional shrink method. Therefore, the method of the present embodiment is superior to that of the conventional art.

As a method for designing a layout of the microlenses 109, considered are a method in which patterns are drawn by using CAD in a collective manner and a method in which predetermined patterns are drawn on a mask at a plurality of times by using electron beam lithography. Either of the methods enables production of drawing data and production of a mask in a very easy manner and is best suited to mass production.

There may be a method in which one part of a layout having a rectangular shape is shrunk and drawn on a mask by using the electron beam lithography and another part of the layout having the rectangular shape is previously shrunk by CAD to produce drawing data to be drawn on a mask. Whereas the electron beam lithography achieves a high resolution obtained upon shrinking, drawing a plurality of patterns on one mask many times may cause positional deviation. On the other hand, although a resolution is low when using the CAD, a number of times at which drawing on a mask is repeated can be reduced, leading to an advantage of reducing positional deviation.

A resolution of the electron beam lithography and a resolution of CAD are approximately 10 nm and 50 nm, respectively. And a positional deviation occurring when using the electron beam lithography is approximately 10 to 100 nm.

As described above, the solid-state image pickup device according to the present embodiment is characterized in that the pixel array region includes the plurality of partial regions having rectangular shapes and the pitches between the microlenses 109 in one of the two neighboring partial regions differ from those between the microlenses 109 in another of the two neighboring partial regions. Therefore, according to the present embodiment, by adjusting the pitches between the microlenses 109 in the H and the V directions for each partial region, a shrink rate in accordance with incidence light characteristics of the camera lens can be set for each of the partial regions. In particular, the solid-state image pickup device according to the present embodiment is suited in a case where shrink rates with respect to a light incidence angle are adjusted in the D1 and the D2 directions.

The shrink method for the solid-state image pickup device according to the present embodiment has a remarkable advantage that a layout is easy as compared with the conventional shrink method. Further, since the plurality of regions are smoothly connected, the shrink method for the solid-state image pickup device according to the present embodiment has an advantage that excellent image characteristics can be obtained.

It is also possible for the shrink method according to the present embodiment to be applied to not only an amplifying solid-state image pickup device but also a CCD solid-state image pickup device. The CCD solid-state image pickup device to which the shrink method according to the present embodiment is applied can exhibit effect similar to that attained by the amplifying solid-state image pickup device according to the present embodiment. Note, however, that the shrink method according to the present embodiment is more advantageous especially when applied to the amplifying solid-state image pickup device. The reason is as follows. Since in general, an amplifying solid-state image pickup device has MOS-FETs in charge detection regions, metal wires (two or more layers) of a plurality of layers are required for supplying voltages. When distances between the microlenses 109 and the photodiodes are increased by the metal wires of the plurality of layers, it is hard for such a general amplifying solid-state image pickup device to receive light as compared with a CCD solid-state image pickup device. In general, the longer the distances between the microlenses 109 and the photodiodes are, the smaller light amounts entering into the photodiodes are.

In the present embodiment, although the pixel array region includes the nine partial regions, it is only required for the number of partial regions to be two or more. When the number of partial regions is equal to or greater than ten, a principal ray angle of a camera lens and an optimum incident angle for each of the pixels can be more precisely matched with each other.

Further, in the present embodiment, although the respective vertexes of the partial region disposed in the central portion of the pixel array region are disposed on the diagonal lines of the pixel array region, these respective vertexes may be disposed so as to be deviated from the diagonal lines.

Further, in the present embodiment, although the partial regions are disposed so as to be point-symmetrical with respect to a center of the pixel array region, the partial regions may be disposed so as to be asymmetrical with respect to the center of the pixel array region.

Further, in the present embodiment, although the pitches between the pixels are not particularly limited, the pitches between the pixels disposed in the peripheral portion of the pixel array region may be set so as to be greater than the pitches between the pixels disposed in the central portion of the pixel array region.

Further, in the solid-state image pickup device according to the present embodiment, if a coupling capacitance is considered similarly to in the fourth embodiment of the present invention described later, the second metal films 106 can be disposed with constant pitches.

Third Embodiment

Hereinafter, a solid-state image pickup device according to a third embodiment of the present invention will be described.

Since a circuit configuration of the solid-state image pickup device according to the present embodiment is same as that of the solid-state image pickup device according to the first embodiment shown in FIGS. 1A and 1B, descriptions on the circuit configuration will be omitted here.

A structure of the solid-state image pickup device according to the present embodiment is same as that of the solid-state image pickup device according to the first embodiment shown in FIG. 1D, except displacement amounts of microlenses 109, color filters 107, and second metal films 106. In other words, as shown in FIG. 1D, pixels are formed on a surface of a semiconductor substrate 101, each of which includes a photodiode 110 serving as a photoelectric conversion region, an insulating film 102 formed so as to cover a surface of the photodiode 110, a first metal film 103 formed so as to cover a surface of the insulating film 102, an insulating film 105 formed so as to cover a surface of the first metal film 103, a second metal film 106 formed so as to cover a surface of the insulating film 105 and having an opening 5 formed above the photoelectric conversion region, a color filter 107 formed so as to cover the opening 5 of the second metal film 106, an insulating film 108, and a microlens (top lens) 109 for converging light into the photoelectric conversion region. In a predetermined position of the pixel, a metal-embedded region (not shown) is formed. And a readout circuit (not shown) for reading out a signal from the photoelectric conversion region is provided in each of the pixels.

When a plurality of layers of metal films are formed on a surface of the semiconductor substrate 101, the second metal film 106 is formed in an uppermost layer. There are cases where the second metal film 106 formed in the uppermost layer has a function of a wire and where the second metal film 106 formed in the uppermost layer has only a function of a light shielding film with no function of a wire. In the present embodiment, the second metal film 106 may be in either of the cases.

Figure 8:
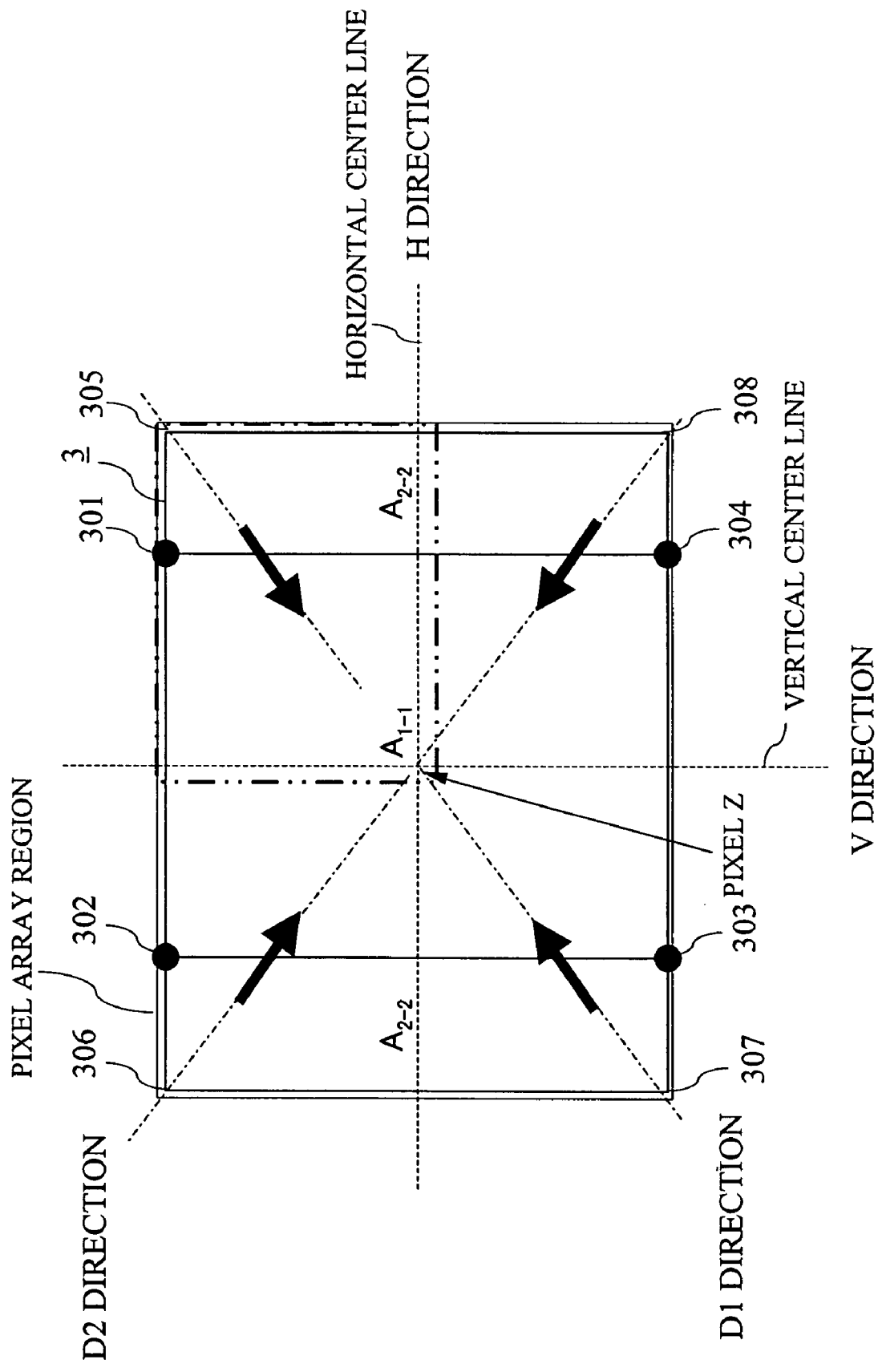
FIG. 8 is a schematic diagram illustrating a layout of microlenses in a solid-state image pickup device according to a third embodiment of the present invention.

FIG. 8 is a schematic diagram illustrating a layout of microlenses 109 in the solid-state image pickup device according to the third embodiment. In FIG. 8, in order to facilitate understanding, a solid line indicates respective regions which constitute a pixel array region and an alternate long and short dashed line indicates directions.

Although in the figures, a pixel Z is supposed to be a pixel in the central portion of the pixel array region, the pixel in which the microlens 109, the color filter 107, and the second metal film 106 are not displaced with each other may be provided in a portion other than the central portion of the pixel array region in the present embodiment.

As shown in FIG. 8, a disposition region 3 for the microlenses 109 comprises three partial regions having the rectangular shapes. More specifically, the disposition region 3 for the microlenses 109 includes a partial region $A_{1-1}$ having a plurality of pixels disposed in a rectangular area in a central portion of the disposition region 3 and two partial regions $A_{2-1}$ and $A_{2-2}$, each of which has a plurality of pixels disposed in a rectangular area and located outside of the partial region $A_{1-1}$.

The partial regions $A_{2-1}$ and $A_{2-2}$ are aligned with the partial region $A_{1-1}$ in an H direction and share sides with the partial region $A_{1-1}$. Respective vertexes 301 to 308 of the partial regions $A_{1-1}$, $A_{2-1}$, and $A_{2-2}$ are positioned on an outer edge of the disposition region 3 for the microlenses 109. Note that positions of the vertexes 301 to 304 of the partial region $A_{1-1}$ are determined in consideration of incident light characteristics of the camera lens.

Here, pitches between microlenses 109 disposed in each of the partial regions included in the disposition region 3 will be described.

The microlenses 109 in a same partial region are disposed so as to have constant pitches both in the H and V directions. However, the pitches of the microlenses 109 in one of the partial regions and those in another partial region adjacent to the one of the partial regions are different from each other at least in one of the H and V directions.

More specifically, the microlenses 109 in the partial region $A_{1-1}$ in the central portion of the disposition region 3 are disposed so as to have constant pitches both in the H and V directions. The pitch between the microlenses 109 is set so as to be shorter than a pitch for disposing the photodiodes.

Next, pitches in the H direction between the microlenses 109 in the partial regions $A_{2-1}$ and $A_{2-2}$ neighboring the partial region $A_{1-1}$ in the H direction are set so as to be same as those in the partial region $A_{1-1}$. Pitches in the V direction between the microlenses 109 in the partial regions $A_{2-1}$ and $A_{2-2}$ are set so as to be different from those in the partial region $A_{1-1}$. In general, the pitches in the V direction between the microlenses 109 in the partial regions $A_{2-1}$ and $A_{2-2}$ are set so as to be longer than those in the partial region $A_{1-1}$.

Figure 9:
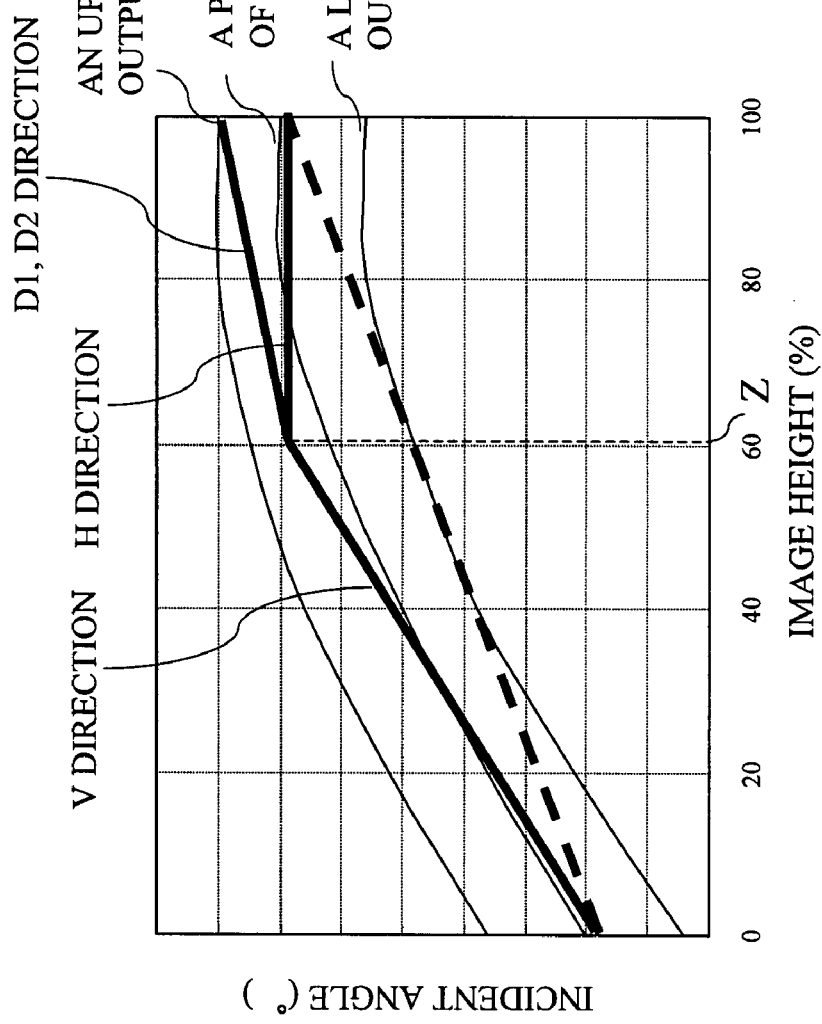
FIG. 9 is a diagram showing a relationship between an image height and an optimum incidence angle for pixels.

FIG. 9 is a diagram showing a relationship between an image height and an optimum incidence angle of light output from the camera lens. In FIG. 9, a solid line indicates a relationship between an image height and an optimum incidence angle in a case where a shrink method according to the present embodiment is adopted and a broken line indicates a relationship between an image height and an optimum incidence angle in a case where the conventional shrink method is adopted.

As shown by the broken line in FIG. 9, in the conventional shrink method, since the microlenses 109 are disposed with constant pitches over an entire area of the pixel array region, an optimum incidence angle for each of the pixels is in proportion to an image height. Accordingly, a principal ray angle output from the camera lens and an optimum incidence angle for each of the pixels greatly differ from each other.

On the contrary, in the shrink method according to the present embodiment, since the pitches between the microlenses 109 are set for each of the partial regions, a shrink rate can be set for each of the partial regions in accordance with light incidence characteristics of the camera lens. Accordingly, as shown by the solid line in FIG. 9, although an optimum incidence angle for each of the pixels in D1 and D2 directions slightly differs from a principal ray angle, an optimum incidence angle for each of the pixels in H and V directions substantially matches with the principal ray angle of the camera lens. Accordingly, the solid-state image pickup device according to the present embodiment allows realizing a high light-gathering efficiency for the pixels aligned at least in the H and V directions.

As described above, the solid-state image pickup device according to the present embodiment is characterized in that the pixel array region includes the plurality of partial regions having rectangular shapes and the pitches between the microlenses 109 in one of the two neighboring partial regions differ from those between the microlenses 109 in another of the two neighboring partial regions. In particular, the solid-state image pickup device according to the present embodiment is suited in a case where shrink rates with respect to a light incidence angle are adjusted in the H and V directions.

The shrink method for the solid-state image pickup device according to the present embodiment has a remarkable advantage that a layout is easy as compared with the conventional shrink method. Further, since the plurality of regions are smoothly connected, the shrink method for the solid-state image pickup device according to the third embodiment has an advantage that excellent image characteristics can be obtained.

It is also possible for the shrink method according to the present embodiment to be applied to not only an amplifying solid-state image pickup device but also a CCD solid-state image pickup device. The CCD solid-state image pickup device to which the shrink method according to the present embodiment is applied can exhibit effect similar to that attained by the amplifying solid-state image pickup device according to the present embodiment. Note, however, that the shrink method according to the present embodiment is more advantageous especially when applied to the amplifying solid-state image pickup device. The reason is as follows. Since in general, an amplifying solid-state image pickup device has MOS-FETs in charge detection regions, metal wires (two or more layers) of a plurality of layers are required for supplying voltages. When distances between the microlenses 109 and the photodiodes are increased by the metal wires of the plurality of layers, it is hard for the general amplifying solid-state image pickup device to receive light as compared with a CCD solid-state image pickup device. In general, the longer the distances between the microlenses 109 and the photodiodes are, the smaller light amounts entering into the photodiodes are.

In the present embodiment, although the disposition region 3 includes the three partial regions, it is only required for the number of partial regions to be two or more. When the number of partial regions is equal to or greater than four, a principal ray angle of a camera lens and an optimum incident angle for each of the pixels can be more precisely matched with each other compared to a solid-state image pickup device having three partial regions.

Further, in the present embodiment, although the disposition region 3 for the microlenses 109 includes the three partial regions aligned in the H direction, the disposition region 3 may include a plurality of partial regions aligned in the V direction.

Further, in the present embodiment, although the partial regions are disposed so as to be point-symmetrical with respect to a center of the pixel array region, the partial regions may be disposed so as to be asymmetrical with respect to the center of the pixel array region.

Further, in the solid-state image pickup device according to the third embodiment, if a coupling capacitance is considered similarly to in the fourth embodiment of the present invention described later, the second metal films 106 can be disposed with constant pitches.

Fourth Embodiment

Hereinafter, a solid-state image pickup device according to a fourth embodiment of the present invention will be described.

Since a circuit configuration of the solid-state image pickup device according to the present embodiment is same as that of the solid-state image pickup device according to the first embodiment shown in FIGS. 1A and 1B, descriptions on the circuit configuration will be omitted here.

A structure of the solid-state image pickup device according to the present embodiment is same as that of the solid-state image pickup device according to the first embodiment shown in FIG. 1D, except displacement amounts of microlenses 109, color filters 107, and second metal films 106. In other words, as shown in FIG. 1D, pixels are formed on a surface of a semiconductor substrate 101, each of which includes a photodiode 110 serving as a photoelectric conversion region, an insulating film 102 formed so as to cover a surface of the photodiode 110, a first metal film 103 formed so as to cover a surface of the insulating film 102, an insulating film 105 formed so as to cover a surface of the first metal film 103, a second metal film 106 formed so as to cover a surface of the insulating film 105 and having an opening 5 formed above the photoelectric conversion region, a color filter 107 formed so as to cover the opening 5 of the second metal film 106, an insulating film 108, and a microlens (top lens) 109 for converging light into the photoelectric conversion region. In a predetermined position of the pixel, a metal-embedded region (not shown) is formed. And a readout circuit (not shown) for reading out a signal from the photoelectric conversion region is provided in each of the pixels.

When a plurality of layers of metal films are formed on a surface of the semiconductor substrate 101, the second metal film 106 is formed in an uppermost layer. There are cases where the second metal film 106 formed in the uppermost layer has a function of a wire and where the second metal film 106 formed in the uppermost layer has only a function of a light shielding film with no function of a wire. In the present embodiment, the second metal film 106 may be in either of the cases.

Figure 10A:
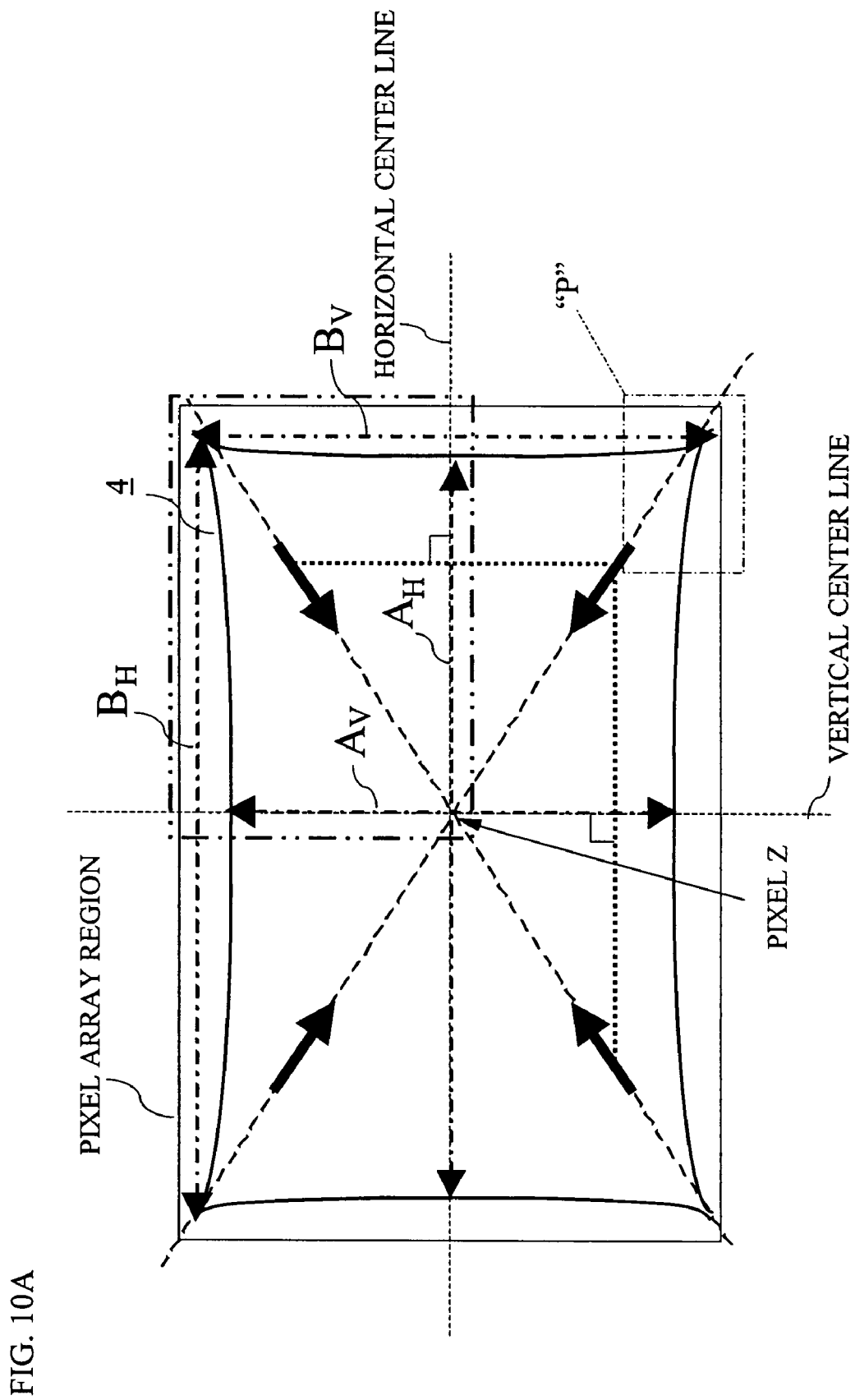
FIG. 10A is a schematic diagram illustrating a layout of microlenses in a solid-state image pickup device according to a fourth embodiment of the present invention.
Figure 10B:
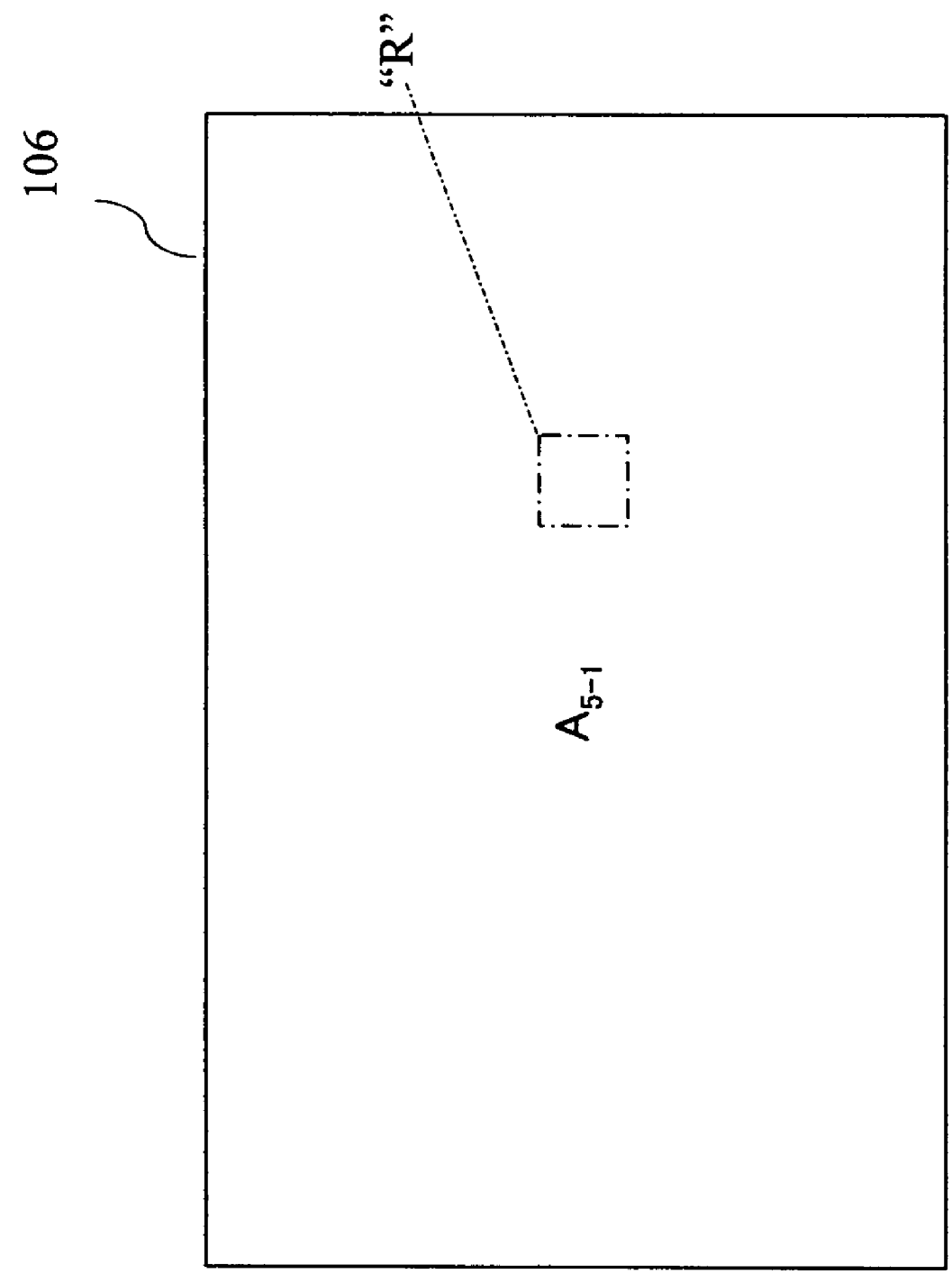
FIG. 10B is a diagram illustrating a second metal film in the solid-state image pickup device according to the fourth embodiment.

FIG. 10A is a schematic diagram illustrating a layout of microlenses 109 in the solid-state image pickup device according to the fourth embodiment. FIG. 10B is a diagram illustrating the second metal film 106 in the solid-state image pickup device according to the fourth embodiment. In FIGS. 10A and 10B, in order to facilitate understanding, a solid line indicates regions and a broken line indicates directions.

As shown in FIG. 10A, in a disposition region 4 of the solid-state image pickup device according to the present embodiment, similarly to in the first embodiment, a plurality of microlenses 109 are disposed.

On the other hand, the second metal film 106 shown in FIG. 10B is formed as a region $A_{5-1}$ where a plurality of openings (not shown) are disposed for each disposition unit AS. Each disposition unit AS has a constant pitch.

Figure 11B:
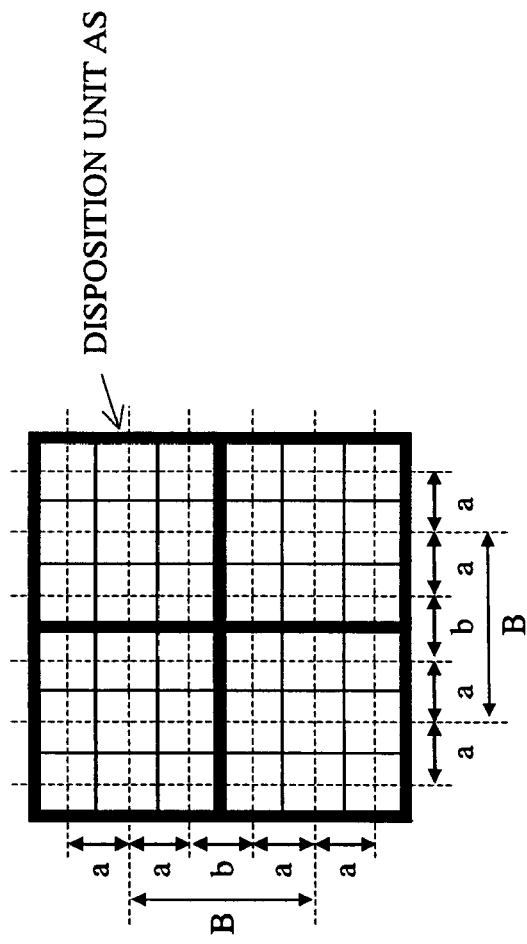
FIG. 11B is diagram illustrating an enlarged view of another example of the portion "R" shown in FIG. 10B.
Figure 11A:
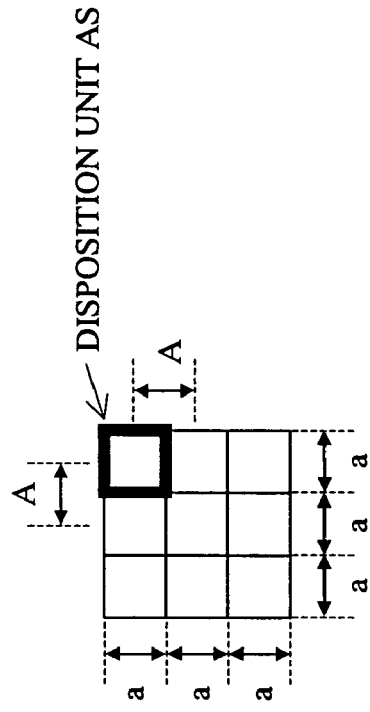
FIG. 11A is a diagram illustrating an enlarged view of one example of the portion "R" shown in FIG. 10B.

FIG. 11A is a diagram illustrating an enlarged view of one example of the portion "R" shown in FIG. 10B and FIG. 11B is diagram illustrating an enlarged view of another example of the portion "R" shown in FIG. 10B.

Here, there are cases where a disposition unit AS is made up of one pixel as shown in FIG. 11A and where a disposition unit is made up of several pixels as shown in FIG. 11B. In the case where a disposition unit is made of several pixels, the disposition pitches in the disposition unit are not necessarily required to be constant.

When the second metal film 106 is disposed per unit of one pixel, it is impossible to dispose the second metal film 106 having a pitch equal to or less than a minimum scale (in general, approximately 0.001 μm) in a CAD layout tool. On the other hand, when the second metal film 106 is disposed per unit of several pixels, it is possible to dispose the metal film 106 having an average pitch equal to or less than a minimum scale in the CAD layout tool, allowing the disposition to be controlled in detail.

In other words, as shown in FIG. 11B, when the disposition unit AS is made up of nine pixels, by setting a pitch "b" to be equal to or less than a pitch "a", it is possible for a disposition pitch B (=2a+b) of a disposition unit AS to be smaller than a disposition pitch 3A (=3a) in a case where a disposition unit AS is made up of one pixel.

That pitches between the microlenses 109 in an entire area of the pixel array region are not equal and that pitches between openings of the second metal film 106 are set to be constant will be described in detail. Hereinafter, FIG. 3 is also utilized for describing the present embodiment.

First, displacement amounts of the second metal films 106, the color filters 107, and the microlenses 109 in the solid-state image pickup device according to the fourth embodiment will be described with reference to FIGS. 3, and 12A to 12C.

Figure 12A:
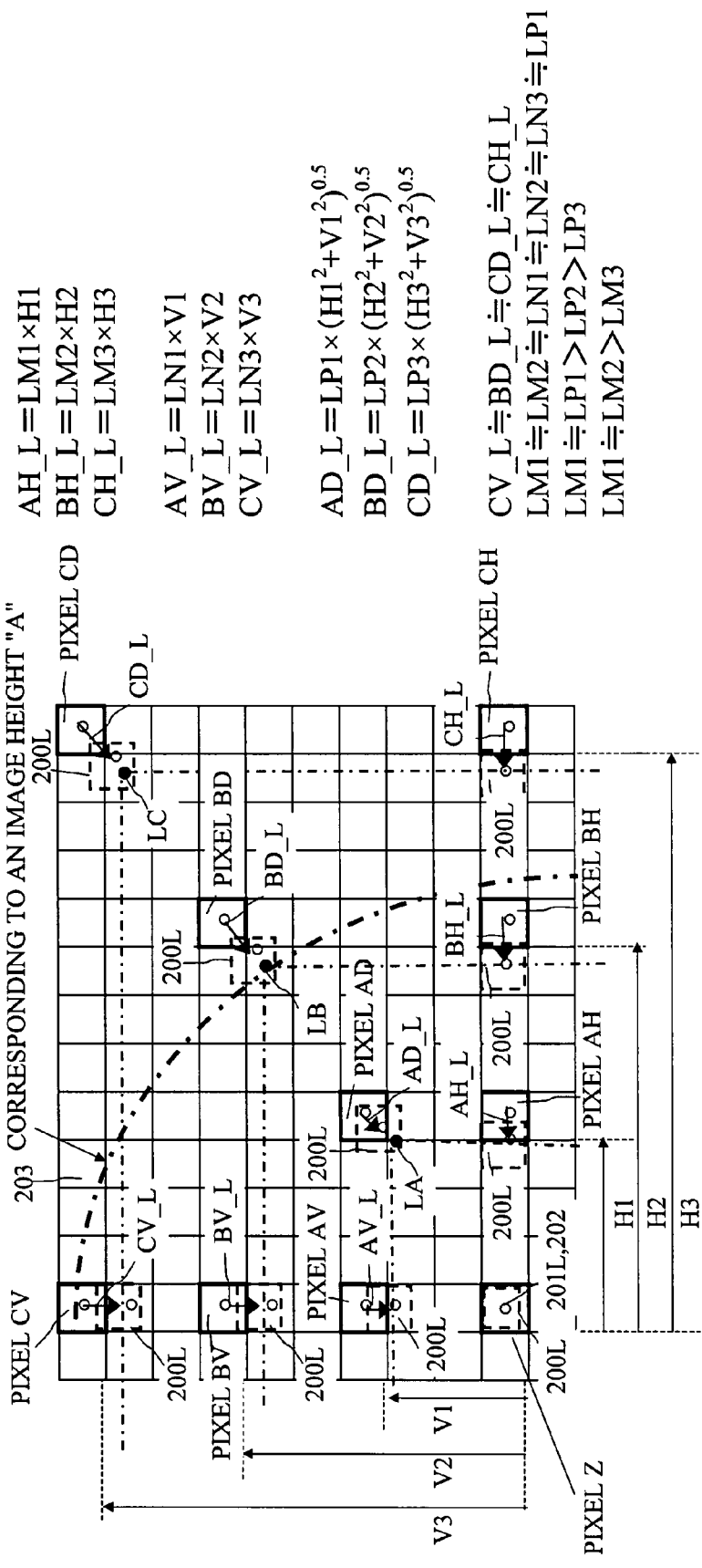
FIG. 12A is a schematic diagram showing displacement amounts of the microlenses in detail.
Figure 12B:
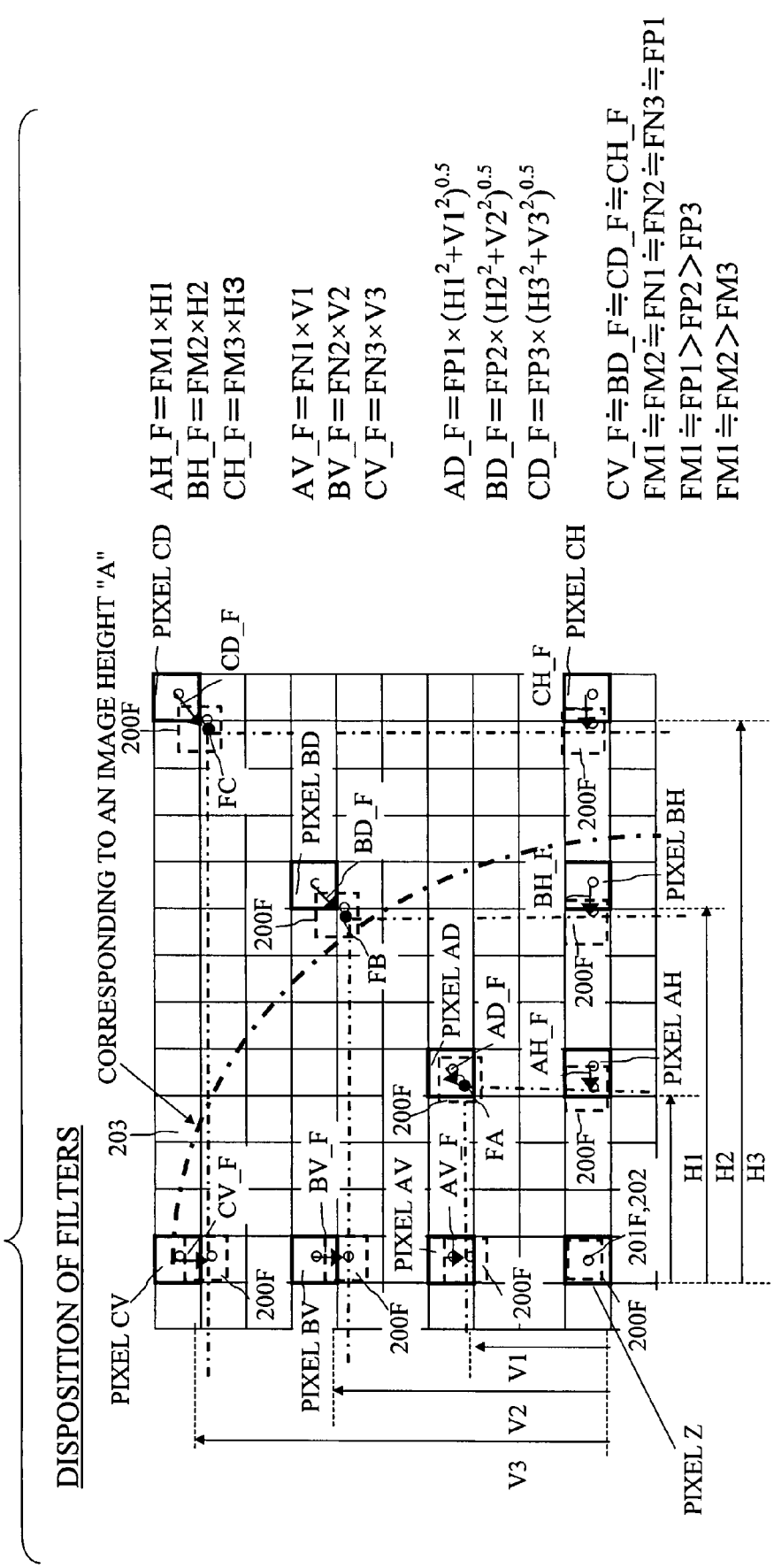
FIG. 12B is a schematic diagram showing displacement amounts of color filters in detail.
Figure 12C:
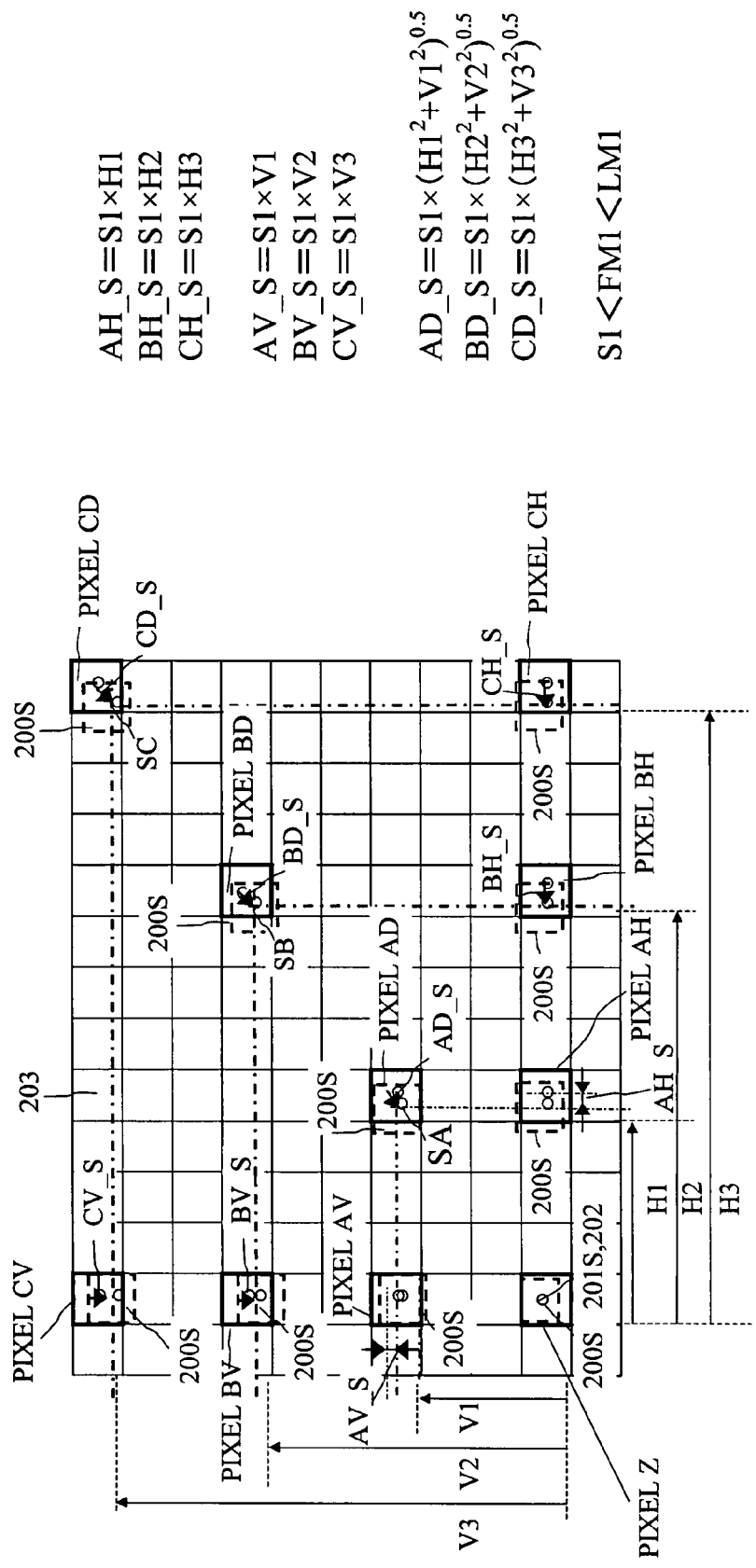
FIG. 12C is a schematic diagram showing displacement amounts of second metal films in detail.

FIG. 12A is a schematic diagram showing the displacement amounts of the microlenses 109 in detail, FIG. 12B is a schematic diagram showing the displacement amounts of the color filters 107 in detail, and FIG. 12C is a schematic diagram showing the displacement amounts of the second metal films 106 in detail. In FIGS. 12A, 12B, and 12C, an alternate long and short dashed line indicates a line drawn when an image height is A.

FIGS. 12A to 12C show displacement amounts, displacement directions, and a displacement method of the microlenses 109, the color filters 107, and the second metal films 106, in a quadrangle which is indicated by an alternate long and two short dashes line and is a part of the pixel array region shown in FIG. 10A.

Displacement amounts and displacement directions of the microlenses 109, the color filters 107, and the second metal films 106 in a portion, of the pixel array region, other than the quadrangle indicated by the alternate long and two short dashes line in FIG. 10A are symmetrical to the displacement amounts and displacement directions shown in FIGS. 12A to 12C, with respect to a horizontal center line and a vertical center line.

In FIGS. 12A to 12C, some pixels (a pixel Z, pixels AH, BH, and CH, pixels AV, BV, and CV, and pixels AD, BD, and CD) among pixels disposed in the pixel array region are shown in detail. The pixel Z is disposed in a central portion of the pixel array region and in the pixel Z, the microlens 109, the color filter 107, and the second metal film 106 are not displaced with each other. The pixels AH, BH, and CH indicate pixels disposed in positions distant from the pixel Z in the horizontal direction toward a peripheral portion, respectively. The pixels AV, BV, and CV indicate pixels disposed in positions distant from the pixel Z in the vertical direction toward the peripheral portion, respectively. Further, the pixels AD, BD, and CD indicate pixels disposed in positions distant from the pixel Z in the oblique direction toward the peripheral portion, respectively.

Although in the figures, the pixel Z is supposed to be a pixel in the central portion of the pixel array region, the pixel in which the microlens 109, the color filter 107, and the second metal film 106 are not displaced with respect to the photodiode may be a pixel other than the pixel in the central portion of the pixel array region in the present embodiment.

The plurality of pixels Z, AH, BH, AV, BV, and AD (pixels disposed inside of a portion indicated by the alternate long and short dashed line) shown in detail in FIGS. 12A to 12C have image heights in a range of 0% to A %. The pixels CH, BD, and CD (pixels disposed outside of the portion indicated by the alternate long and short dashed line) have image heights in a range of A % to 100%.

In FIG. 12A, quadrangles drawn by a thick solid line indicate positions of the photodiodes and quadrangles drawn by a broken line indicate positions of the microlenses 109. Here, displacement amounts (distances between centers of the photodiodes and centers of the microlenses 109) of the microlenses 109 in the pixels AH, BH, and CH are shown as AH_L, BH_L, and CH_L, respectively. Displacement amounts of the microlenses 109 in the pixels AV, BV, and CV are shown as AV_L, BV_L, and CV_L, respectively. Displacement amounts of the microlenses 109 in the pixels AD, BD, and CD are shown as AD_L, BD_L, and CD_L, respectively.

In FIG. 12B, quadrangles drawn by a thick solid line indicate positions of the photodiodes and quadrangles drawn by a broken line indicate positions of the color filters 107. Here, displacement amounts (distances between centers of the photodiodes and centers of the color filters 107) of the color filters 107 in the pixels AH, BH, and CH are shown as AH_F, BH_F, and CH_F, respectively. Displacement amounts of the color filters 107 in the pixels AV, BV, and CV are shown as AV_F, BV_F, and CV_F, respectively. Displacement amounts of the color filters 107 in the pixels AD, BD, and CD are shown as AD_F, BD_F, and CD_F, respectively.

In FIG. 12C, quadrangles drawn by a thick solid line indicate positions of the photodiodes and quadrangles drawn by a broken line indicate positions of the second metal films 106. Here, displacement amounts (distances between centers of the photodiodes and centers of openings formed in the second metal films 106) of the second metal films in the pixels AH, BH, and CH are shown as AH_S, BH_S, and CH_S, respectively. Displacement amounts of the second metal films in the pixels AV, BV, and CV are shown as AV_S, BV_S, and CV_S, respectively. Displacement amounts of the second metal films in the pixels AD, BD, and CD are shown as AD_S, BD_S, and CD_S, respectively.

Each of the above-mentioned displacement amounts in the respective figures is calculated by multiplying each of distances (H1, H2, H3, V1, V2, and V3) between a center 201L of the pixel Z and a center 200L of each of the pixels by each of predetermined coefficients (any of LM1 to LM3, LN1 to LN3, and LP1 to LP2) respectively, in accordance with formulas shown in the respective figures. The coefficients (for example, LM1, LM2 and the like) are determined in accordance with characteristics of the camera lens.

As shown in FIG. 3, as the characteristics of the camera lens used with the solid-state image pickup device according to the present embodiment, a principal ray angle of a light beam passing through the camera lens monotonously increases when an image height is in a range of 0% to A % and is substantially constant when an image height is in a range of A % to 100%. As characteristics of a general camera lens, an image height A is usually in a range of 60% to 80%.

Therefore, in the solid-state image pickup device according to the present embodiment, shrink (displacement) is performed for the microlenses 109 so that in accordance with a change in the principal ray angle, the displacement amount monotonously increases when the image height is in a range of 0% to A % and is substantially constant when the image height is equal to or greater than A %.

Specifically, an absolute value of a displacement amount between a center 200L of each of the pixels and a center 201L of a microlens 109 for each of pixels, disposed in a region whose image height is in a range of 0% to A %, can be substantially in proportion to an image height by making each of the coefficient (LM1, LM2, LN1, LN2, LN3, and LP1) constant. And the respective coefficients for pixels, disposed in a region whose image height is equal to or greater than A %, are set so as to satisfy relationships of the following formulas 10 to 12.

$$LM1 \approx LM2 \approx LN1 \approx LN2 \approx LN3 \quad \text{[Formula 10]}$$

$$LM1 \approx LP1 > LP2 > LP3 \quad \text{[Formula 11]}$$

$$LM1 \approx LM2 > LM3 \quad \text{[Formula 12]}$$

In the solid-state image pickup device according to the present embodiment, by setting values of the respective coefficients in such a manner, the displacement amounts (CH_L, BD_L, CD_L, and CV_L) of the pixels whose image heights are greater than A can be made substantially equal.

In other words, the respective displacement amounts CH_L, BD_L, CD_L, and CV_L satisfy a relationship of CH_L≈BD_L≈CD_L≈CV_L. And the other displacement amounts satisfy relationships AH_L<BH_L, AV_L<BV_L<CV_L, BH_L≦CV_L, and AD_L≦BD_L.

On the other hand, as shown in FIG. 12C, in the solid-state image pickup device according to the present embodiment, a coefficient used for setting the displacement amounts of the second metal films 106 is set to be S1, that is a constant value. Accordingly, the displacement amounts of the second metal films 106 can be obtained by multiplying distances (H1, H2, H3, V1, V2, and V3) between a center of the pixel Z and a center of each of the pixels by the constant coefficient S1.

As a result, the respective displacement amounts of the second metal films 106 satisfy relationships of AH_S<BH_S<CH_S, AV_S<BV_S<CV_S, and AD_S<BD_S<CD_S.

In the solid-state image pickup device according to the present embodiment, the displacement amounts of the color filters 107 are set similarly to those set for the microlenses 109.

As shown in FIG. 3, as the characteristics of the camera lens used with the solid-state image pickup device according to the present embodiment, a principal ray angle of a light beam passing through the camera lens monotonously increases when an image height is in a range of 0% to A % and is substantially constant when an image height is equal to or greater than A %. As characteristics of a general camera lens, an image height A is usually in a range of 60% to 80%.

Therefore, in the solid-state image pickup device according to the present embodiment, shrink is performed for the color filters 107 so that in accordance with a change in the principal ray angle, the displacement amount of the color filters 107 monotonously increases when the image height is in a range of 0% to A % and is substantially constant when the image height is equal to or greater than A %.

Specifically, an absolute value of a displacement amount between a center 200L of each of the pixels and a center 200F of a color filter 107 for each of pixels, disposed in a region whose image height is in a range of 0% to A %, can be substantially in proportion to an image height by making each of the coefficient (FM1, FM2, FN1, FN2, FN3, and FP1) constant. And the respective coefficients for pixels, disposed in a region whose image height is equal to or greater than A %, are set so as to satisfy relationships of the following formulas 13 to 15.

$$FM1 \approx FM2 \approx FN1 \approx FN2 \approx FN3 \quad \text{[Formula 13]}$$

$$FM1 \approx FP1 > FP2 > FP3 \quad \text{[Formula 14]}$$

$$FM1 \approx FM2 > FM3 \quad \text{[Formula 15]}$$

In the solid-state image pickup device according to the present embodiment, by setting values of the respective coefficients in such a manner, the displacement amounts (CH_F, BD_F, CD_F, and CV_F) of the pixels whose image heights are greater than A % can be made substantially equal.

In other words, the respective displacement amounts CH_F, BD_F, CD_F, and CV_F satisfy a relationship of CH_F≈BD_F≈CD_F≈CV_F. And the other displacement amounts satisfy relationships of AH_F<BH_F, AV_F<BV_F<CV_F, BH_F≦CV_F, and AD_F≦BD_F.

In the present embodiment, although the displacement amounts of the color filters 107 are set similarly to those set for the microlenses 109, the displacement amounts of the color filters 107 in another example may be set similarly to those set for the second metal films 106. In other words, the displacement amounts of the color filters 107 may be set as values obtained by multiplying the distances (H1, H2, H3, V1, V2, and V3) between a center of an image pickup position Z and a center of each of the pixels by a constant coefficient.

Further, with reference to FIG. 13A, a method of setting the displacement amounts of the microlenses 109, the color filters 107, and the second metal films 106 in the present embodiment will be described in detail.

Figure 13A:
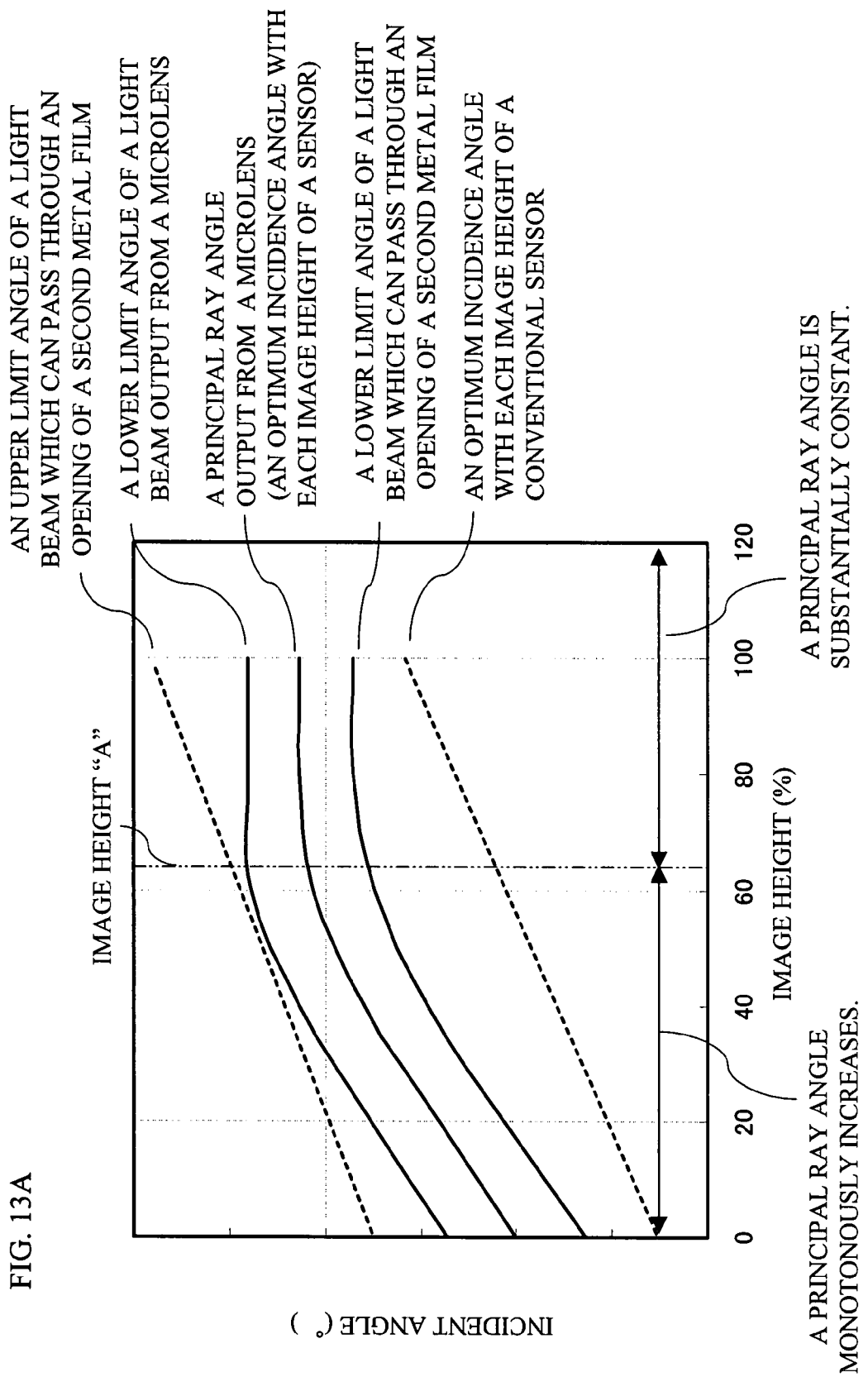
FIG. 13A is a diagram showing a relationship between an image height and an angle of a light beam passing through an opening of the second metal film.

FIG. 13A is a diagram showing a relationship between an image height and an angle of a light beam passing through an opening of the second metal film 106.

Because the microlenses 109 determine light-converging directions of incident light, positional deviation of the photodiodes, which may occur in a manufacturing process, directly exerts influence on light-converging characteristics of the respective pixels. However, because the second metal films 106 do not exert any influence on the light-gathering directions of incident light, it is only required for the second metal films 106 to be disposed so as not to reflect or scatter incident light. Accordingly, a little positional deviation of the openings formed on the second metal films 106 is permissible.

In general, as shown by broken lines in FIG. 13A, a difference between an upper limit angle and a lower limit angle of a light beam passing through the opening of the second metal film 106 is sufficiently large, as compared with a difference between an upper limit angle and a lower limit angle of light converged by the camera lens. Accordingly, as long as the positional deviation between the opening of the second metal film 106 and the microlens 109 is in a permissible range, there accrues no problem on light-converging characteristics of the respective pixels. Therefore, as in the solid-state image pickup device according to the present embodiment, the second metal film 106 can be formed so as to have one region having a constant pitch between the openings thereof.

In FIG. 13A, it is understood that a difference between an upper limit angle and a lower limit angle of a light beam passing through the opening of the second metal film 106 is sufficiently larger than a difference between an upper limit angle and a lower limit angle of light converged by the camera lens. Accordingly, even if pitches of the second metal films 106 are made constant when setting the displacement amounts of the second metal films 106, light beams entering from the microlenses 109 are not blocked by the second metal films 106 across an entire range from an upper limit angle and a lower limit angle and can enter the photodiodes. This is the reason that the displacement amounts of the second metal films 106 are set as shown in FIG. 12C.

Accordingly, it is only required for the openings of the second metal films 106 to be formed having constant pitches. A mask used for forming the second metal films 106 can be formed in an extremely easy manner as compared with a case where a mask is produced by diving a mask into a plurality of regions. In this case, in view of preventing positional deviation of a mask, it is preferable to use electron beam lithography for forming a mask since mask patterns can be drawn at one time.

As described above, the solid-state image pickup device according to the present embodiment is characterized in that the pixel array region thereof includes the plurality of regions having the microlenses 109 disposed in rectangular areas with different pitches and that the openings of the second metal films 106 are formed with constant pitches.

In other words, the solid-state image pickup device according to the present embodiment has a feature that whereas the microlenses 109 in the pixel array region are formed with different pitches, the openings of the second metal films 106 are formed with constant pitches.

Moreover, with reference to FIGS. 13B to 13D, a point that the solid-state image pickup device according to the present embodiment is further advantageous as compared with the solid-state image pickup device according to the first embodiment will be described in detail.

Figure 13B:
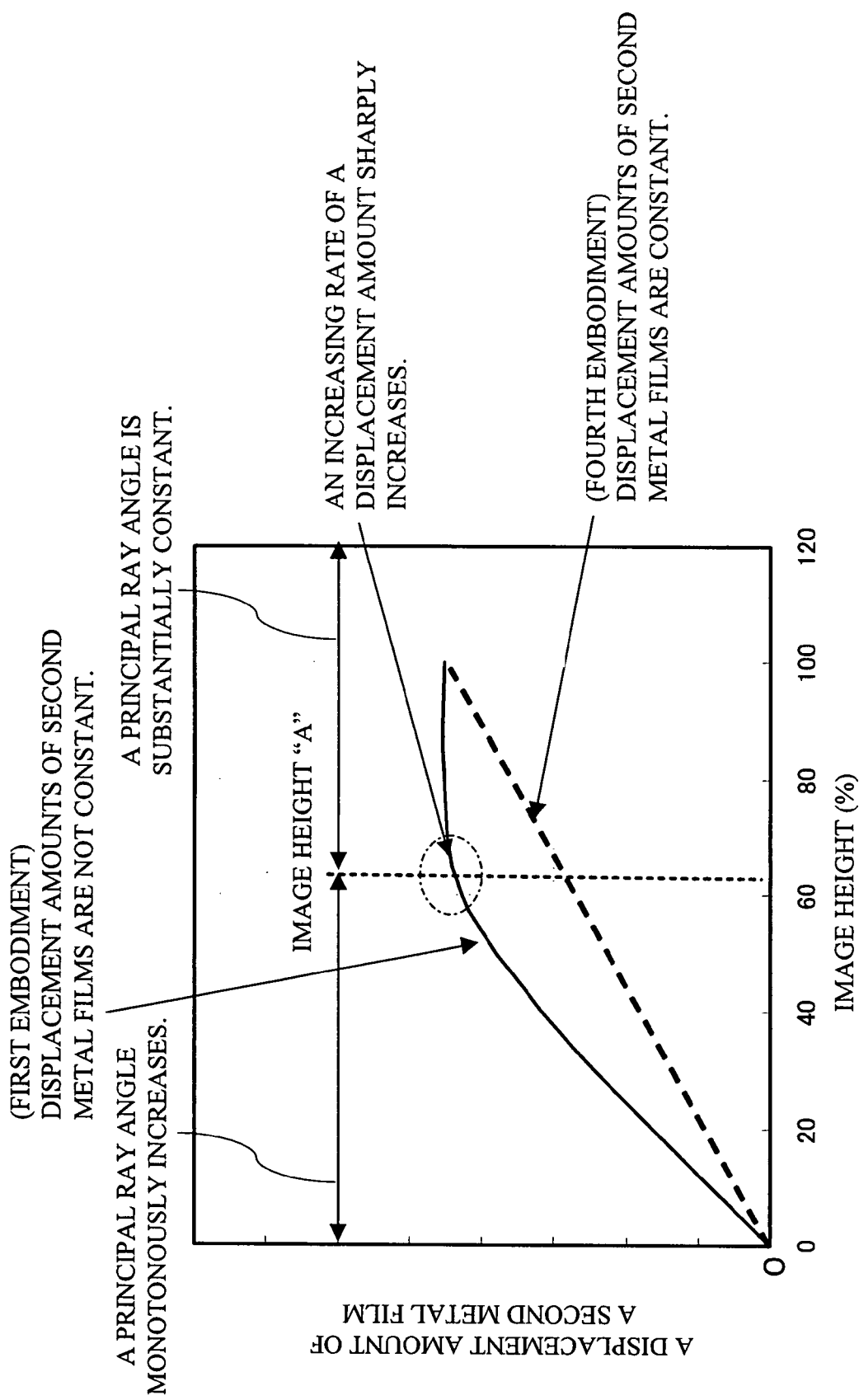
FIG. 13B is a diagram showing a relationship between an image height and a displacement amount of a light-shielding film.

FIG. 13B is a diagram showing a relationship between an image height and a displacement amount of a light-shielding film. FIG. 13C is a diagram showing a relationship between an image height and a coupling capacitance of the first metal film 103 and the second metal film 106. FIG. 13D is a schematic diagram illustrating a cross-sectional view of a pixel disposed in the peripheral portion of the pixel array region.

First, in the present embodiment, the second metal films 106 are formed with constant pitches. And the first metal films 103 are formed at positions closer to the photodiodes 110 than the microlenses 109, the color filters 107, and the second metal films 106 are. Therefore, the displacement amounts of the first metal films 103 monotonously increase when an image height is in a range of 0% to A %. In a case where an image height is equal to or greater than A %, even if the displacement amounts of the first metal films 103 are set to be substantially constant, influence that the first metal films 103 exert on enhancement of sensitivity characteristics is small as compared with influence on the sensitivity characteristics caused by the microlenses 109, the color filters 107, the second metal films 106, in which the displacement amounts are set similarly to those set for the first metal films 103.

When reductions in time required for designing a layout, manufacturing a product, and preparing a variety of products, and a reduction in cost are considered, in many cases, the first metal films 103 are formed with constant pitches.

On the contrary, in the first embodiment, the displacement amounts of the second metal films 106 are set so as to monotonously increase when an image height is in a range of 0% to A % and to be substantially constant when an image height is equal to or greater than A %, in accordance with characteristics of the camera lens as shown in FIG. 3. Accordingly, as shown in FIG. 13B, when an image height is around A %, change amounts of the displacement amounts of the second metal films 106 sharply increase.

Figure 13C:
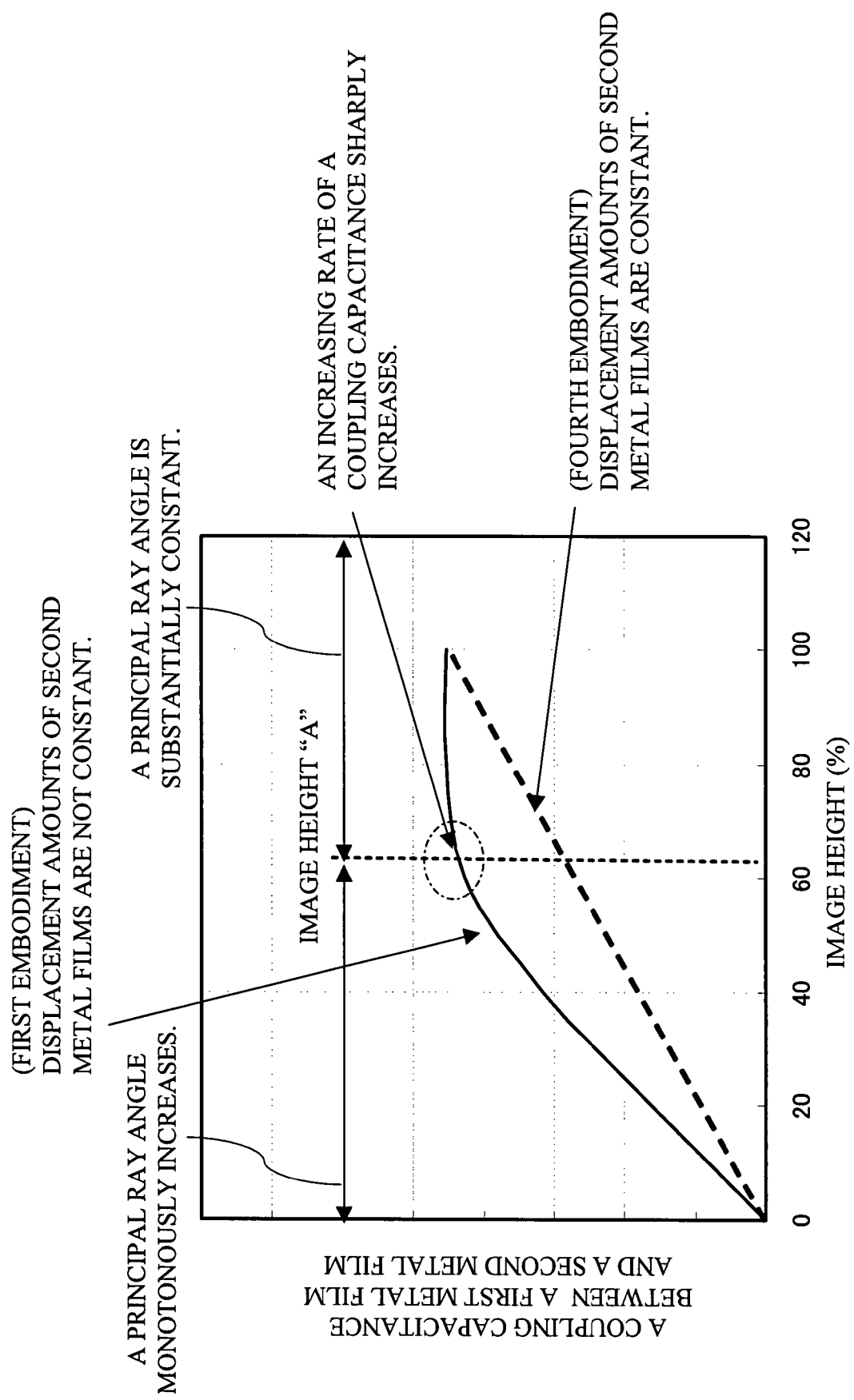
FIG. 13C is a diagram showing a relationship between an image height and a coupling capacitance between the first metal film and the second metal film.
Figure 14:
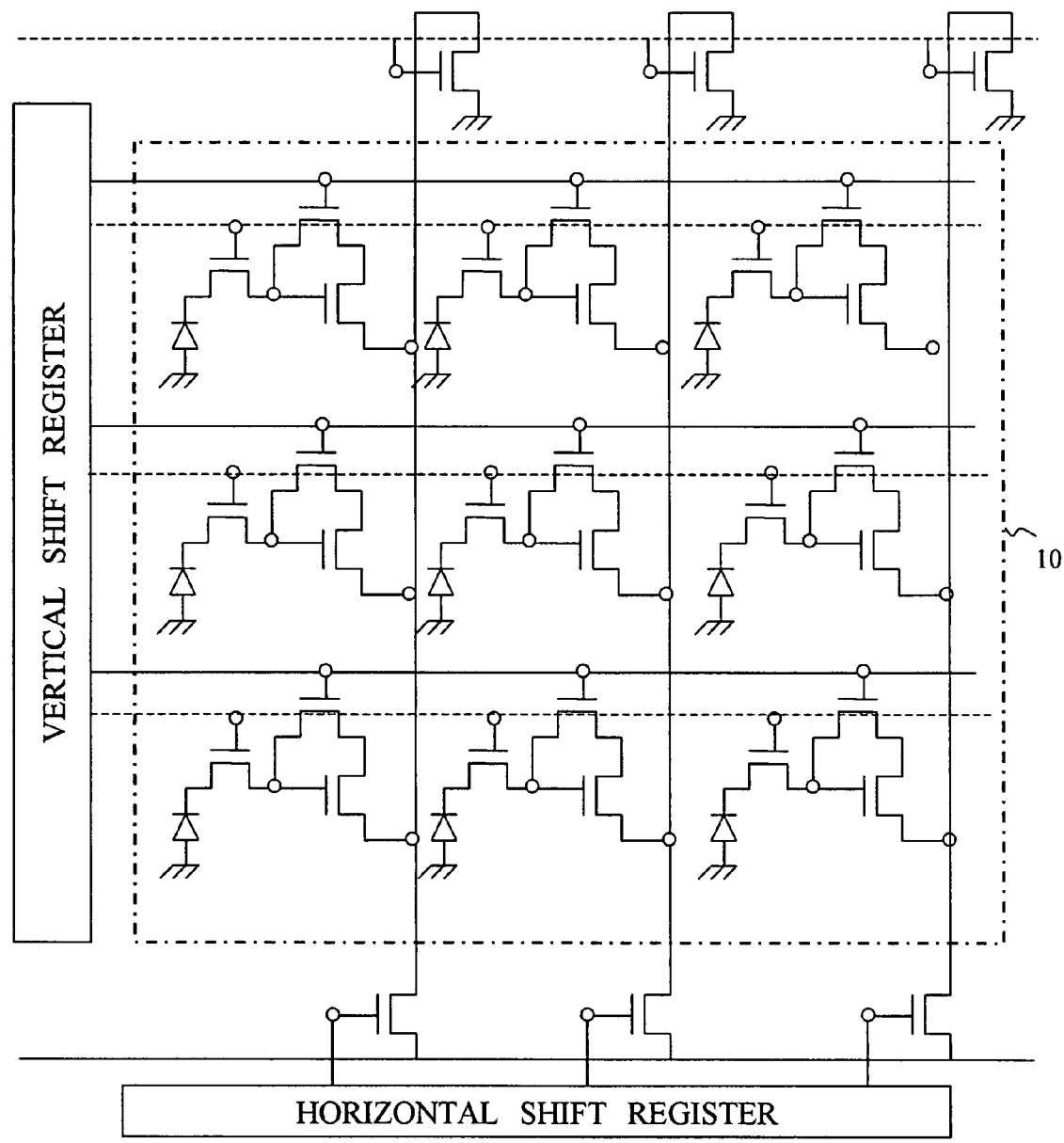
FIG. 14 is a schematic diagram illustrating a configuration of a general amplifying solid-state image pickup device.
Figure 16:
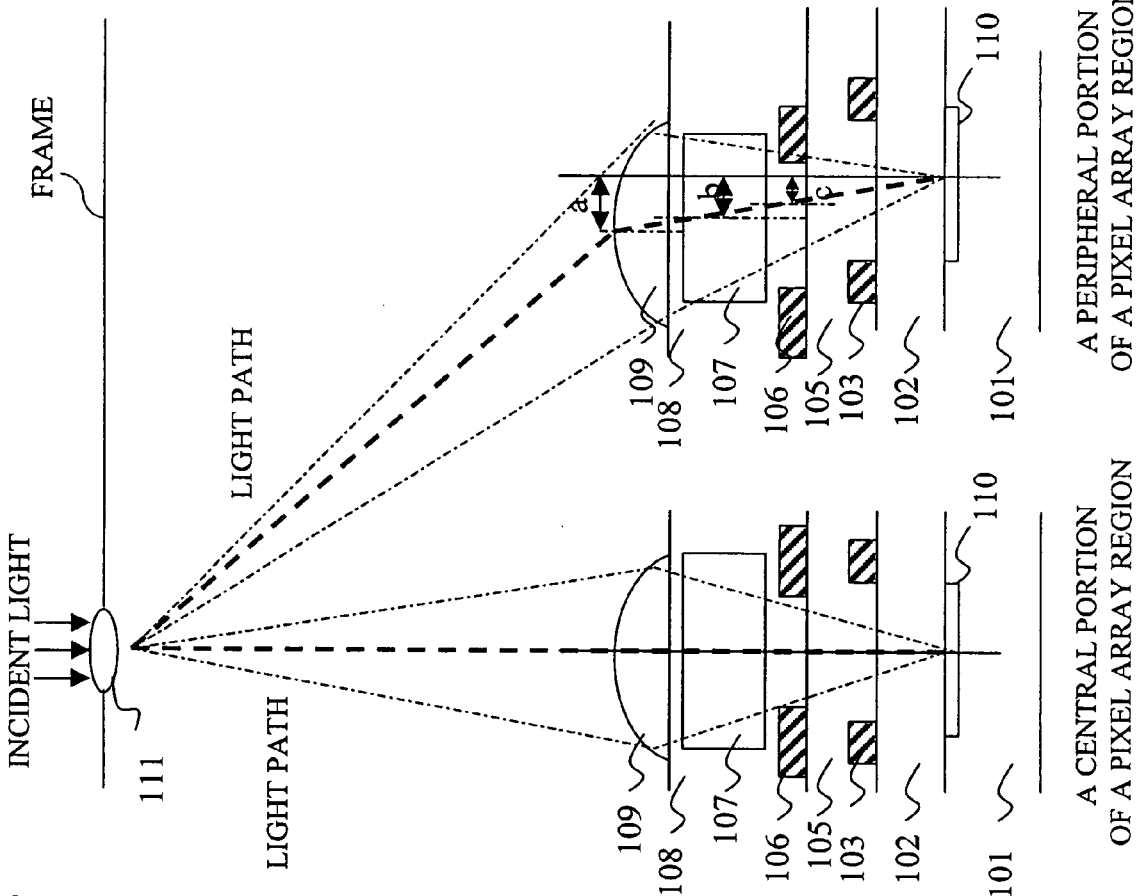
FIG. 16 is a schematic diagram explaining incidence of light into the pixels disposed in the central and peripheral portions of the pixel array.
Figure 17:
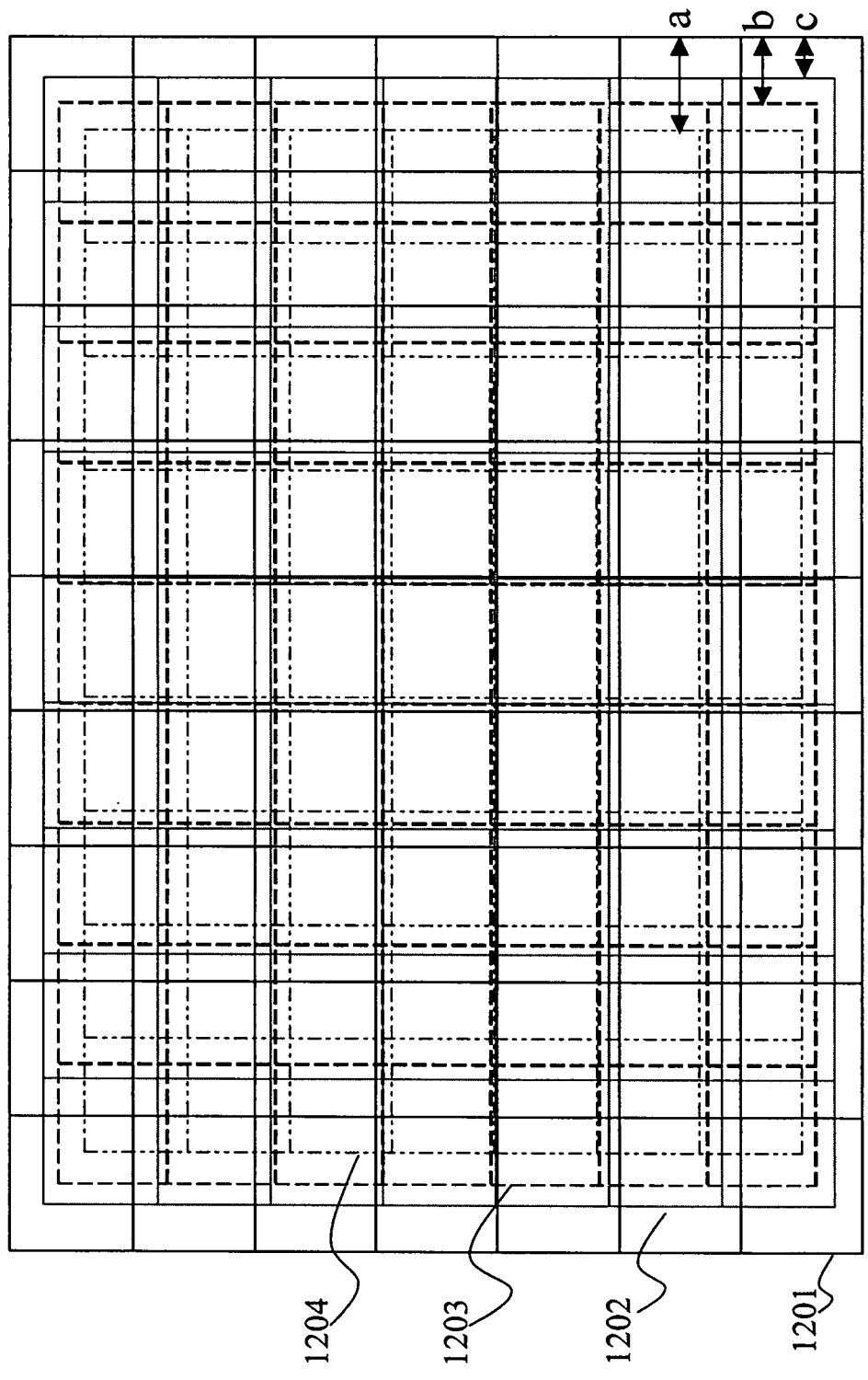
FIG. 17 is a schematic diagram showing a conventional shrink method.

Therefore, the solid-state image pickup device in the first embodiment, as shown in FIG. 13C, a coupling capacitance of the first metal film 103 and the second metal film 106 may sharply increase when an image height is around A %. In this case, when a pixel signal is outputted as an image, it is considered that deterioration of an image may arise, i.e., that an output image composed of pixel signals has a darker (or brighter) portion whose image height is around A %.

The reason is as follows. In general, a metal film (metal wiring layer) has a function of converting an accumulated charge of a photodiode in a solid-state image pickup device into a potential and retaining the converted potential. The second metal film 106 may be used for retaining a potential or wiring for being grounded. Therefore, there exists a coupling capacitance between the second metal film 106 and the first metal film 103. When the second metal film 106 is disposed so as to be greatly deviated from the first metal film 103, a relative positional relationship between the first metal film 103 and the second metal film 106 drastically changes depending on a position of a pixel, whereby the coupling capacitance may change.

On the contrary to this, the solid-state image pickup device according to the present embodiment is characterized in that the first metal films 103 are disposed with constant pitches. Accordingly, a coupling capacitance between the second metal film 106 and the first metal film 103 changes in a gradual and linear manner. Therefore, the solid-state image pickup device according to the present embodiment can suppress image deterioration, i.e., a darker (or brighter) portion whose image height is around A % occurring in an image composed of output pixel signals.

According to the present embodiment, time required for a layout design process, performed when a photo mask having a layout of the first metal film 103 can be reduced. Further, time required for manufacturing a product and preparing a variety of products is designed can be reduced, thereby leading to a cost reduction.

In the present embodiment, the first metal films 103 can be disposed with constant pitches in accordance with the same calculations as those applied to the first embodiment except for setting coefficients, used for obtaining the pitches between the second metal films 106, to be constant values.

It is also possible for the shrink method according to the present embodiment to be applied to not only an amplifying solid-state image pickup device but also a CCD solid-state image pickup device. The CCD solid-state image pickup device to which the shrink method according to the present embodiment is applied can exhibit effect similar to that attained by the amplifying solid-state image pickup device according to the present embodiment. Note, however, that the shrink method according to the present embodiment is more advantageous especially when applied to the amplifying solid-state image pickup device. The reason is as follows. Since in general, an amplifying solid-state image pickup device has MOS-FETs in charge detection regions, a plurality of layers (two or more layers) of metal wires are required for supplying voltages. Since the metal wires block light, it is hard for a general amplifying solid-state image pickup device to receive light as compared with a CCD solid-state image pickup device. In general, the longer the distances between the microlenses 109 and the photodiodes are, the smaller light amounts entering into the photodiodes are.

Since the solid-state image pickup device and the mask fabrication method according to the present invention has features in that a layout of the microlenses is easy and image characteristics are excellent. Therefore, the solid-state image pickup device and the mask fabrication method according to the present invention are applicable to a solid-state image pickup device used, for example, in a digital camera or the like.

While the invention has been described in detail, the foregoing description is in all aspects illustrative and not restrictive. It is understood that numerous other modifications and variations can be devised without departing from the scope of the invention.

What is claimed is:

1. A solid-state image pickup device, comprising a pixel array region, on a semiconductor substrate, where a plurality of pixels are two-dimensionally disposed in a row direction and a column direction, wherein:

each of the pixels includes:
        a photoelectric conversion region; and
        a microlens for converging light into the photoelectric conversion region,
    disposition of the microlens is determined for each of the pixels,
    the microlenses are two-dimensionally disposed with different pitches,
    the microlenses are disposed in a disposition region such that an outer shape of the disposition region has at least one curve which connects two adjacent vertexes of the disposition region and is concave with respect to a line passing through the two adjacent vertexes, and
    a distance between a center of the microlens and a center of said each of the pixels is set so as to increase in accordance with an increase in an image height until the image height reaches a predetermined value and to be substantially constant after the image height exceeds the predetermined value.

2. The solid-state image pickup device according to claim 1, wherein the solid-state image pickup device is an amplifying solid-state image pickup device.

3. The solid-state image pickup device according to claim 1, wherein the pixels are disposed such that a pitch between the pixels in a peripheral portion of the pixel array region is greater than a pitch between the pixels in a central portion of the pixel array region.

4. The solid-state image pickup device according to claim 3, wherein the solid-state image pickup device is an amplifying solid-state image pickup device.

* * * * *